US011111950B2

(12) United States Patent
Hess et al.

(10) Patent No.: US 11,111,950 B2
(45) Date of Patent: Sep. 7, 2021

(54) LOCKING MECHANISMS WITH DEFLECTABLE LOCK MEMBER

(71) Applicant: Enduralock, LLC, Lenexa, KS (US)

(72) Inventors: Harold Hess, Leawood, KS (US); Zoltan Kalman Furu-Szekely, Cypress, TX (US); Deeptesh Selvaraj, Overland Park, KS (US)

(73) Assignee: Enduralock, LLC, Lenexa, KS (US)

( * ) Notice: Subject to any disclaimer, the term of this patent is extended or adjusted under 35 U.S.C. 154(b) by 260 days.

(21) Appl. No.: 16/371,911

(22) Filed: Apr. 1, 2019

(65) Prior Publication Data

US 2020/0309185 A1 Oct. 1, 2020

(51) Int. Cl.
*F16B 39/282* (2006.01)
*F16B 39/32* (2006.01)
*F16B 39/24* (2006.01)

(52) U.S. Cl.
CPC ............ *F16B 39/282* (2013.01); *F16B 39/24* (2013.01); *F16B 39/32* (2013.01)

(58) Field of Classification Search
CPC .......... F16B 39/22; F16B 39/24; F16B 39/26; F16B 39/32; F16B 39/282
USPC ....................................................... 411/326
See application file for complete search history.

(56) References Cited

U.S. PATENT DOCUMENTS

| | | |
|---|---|---|
| 307,671 A | 11/1884 | McTighe |
| 545,516 A | 9/1895 | Mershon |
| 646,337 A | 3/1900 | Wilson et al. |
| 771,733 A | 10/1904 | Johnson |
| 779,632 A | 1/1905 | Wolf |
| 826,591 A | 7/1906 | Mohr |
| 848,176 A | 3/1907 | Jordan |
| 892,507 A | 7/1908 | Dorsey |
| 898,003 A | 9/1908 | Posson |

(Continued)

FOREIGN PATENT DOCUMENTS

EP 2110567 A2 10/2009

OTHER PUBLICATIONS

International Search Report and Written Opinion for PCT/US 20-25695 dated Aug. 14, 2020, 22 pp.

(Continued)

*Primary Examiner* — Roberta S Delisle
(74) *Attorney, Agent, or Firm* — Armstrong Teasdale LLP

(57) ABSTRACT

A fastener assembly includes a threaded member including a threaded body portion and a head portion. The fastener assembly also includes a first lock member including a plurality of axially-extending ratchet teeth and defining an aperture extending therethrough. The aperture is sized to receive the threaded body portion. The fastener assembly further includes a second lock member including a base portion configured to couple to the threaded member for rotation therewith and at least one spring finger extending axially from the base portion. The at least one spring finger has a proximal end joined to the base portion and a free end opposite the proximal end. The second lock member has a lock position in which the free end of the at least one spring finger is configured to engage the plurality of axially-extending ratchet teeth and an unlock position in which the free end of the at least one spring finger is spaced from the plurality of axially-extending ratchet teeth.

32 Claims, 32 Drawing Sheets

(56) References Cited

U.S. PATENT DOCUMENTS

| | | |
|---|---|---|
| 907,473 A | 12/1908 | De Tray |
| 955,054 A | 4/1910 | Darby et al. |
| 961,371 A | 6/1910 | Posey |
| 1,011,871 A | 12/1911 | Smoke |
| 1,057,209 A | 3/1913 | Andrews |
| 1,075,925 A | 10/1913 | Maxwell |
| 1,140,974 A | 5/1915 | Formby |
| 1,143,508 A * | 6/1915 | Conroy ............... F16B 39/32 411/329 |
| 1,225,626 A | 5/1917 | Hannon et al. |
| 1,246,353 A | 11/1917 | Vonlon |
| 1,249,336 A | 12/1917 | Cook |
| 1,276,882 A | 8/1918 | Davis |
| 1,287,371 A | 12/1918 | McClay et al. |
| 1,289,710 A | 12/1918 | Ervin |
| 1,337,424 A | 4/1920 | Word |
| 1,394,741 A * | 10/1921 | Klocke ............... F16B 39/26 411/135 |
| 1,403,902 A | 1/1922 | Fields |
| 1,509,948 A | 9/1924 | Hall |
| 1,526,914 A | 2/1925 | Kibler |
| 1,646,805 A * | 10/1927 | Bell ............... F16B 39/32 411/329 |
| 2,018,574 A | 10/1935 | Richter |
| 2,131,812 A | 10/1938 | Maguire |
| 2,141,701 A | 12/1938 | Uherkovich |
| 2,398,965 A | 4/1946 | Rounds |
| 3,294,140 A | 12/1966 | Cosenza |
| 3,712,355 A | 1/1973 | Schenk |
| 3,804,140 A | 4/1974 | Harper |
| 4,812,094 A * | 3/1989 | Grube ............... F16B 39/10 411/134 |
| 5,190,423 A | 3/1993 | Ewing |
| 5,224,806 A | 7/1993 | Duran |
| 5,460,468 A | 10/1995 | DiStacio |
| 5,533,852 A | 7/1996 | Matthews |
| 5,538,378 A | 7/1996 | Van Der Drift |
| 5,575,602 A | 11/1996 | Savage et al. |
| 5,597,278 A | 1/1997 | Peterkort |
| 5,618,143 A | 4/1997 | Cronin, II et al. |
| 5,702,214 A | 12/1997 | Duran |
| 5,713,708 A | 2/1998 | Van Der Drift et al. |
| 5,735,853 A | 4/1998 | Olerud |
| 5,951,224 A | 9/1999 | DiStasio |
| 6,010,289 A | 1/2000 | DiStasio et al. |
| 6,082,941 A | 7/2000 | Dupont et al. |
| 6,139,550 A | 10/2000 | Michelson |
| 6,258,089 B1 | 7/2001 | Campbell et al. |
| 6,261,291 B1 | 7/2001 | Talaber et al. |
| 6,361,257 B1 | 3/2002 | Grant |
| 6,383,186 B1 | 5/2002 | Michelson |
| 6,398,783 B1 | 6/2002 | Michelson |
| 6,413,259 B1 | 7/2002 | Lyons et al. |
| 6,434,792 B1 | 8/2002 | Williamson |
| 6,602,255 B1 | 8/2003 | Campbell et al. |
| 6,626,907 B2 | 9/2003 | Campbell et al. |
| 6,695,846 B2 | 2/2004 | Richelsoph et al. |
| 6,755,833 B1 | 6/2004 | Paul et al. |
| 6,935,822 B2 | 8/2005 | Hartmann et al. |
| 6,976,816 B2 | 12/2005 | Slesinski et al. |
| 6,976,817 B1 | 12/2005 | Grainger |
| 7,128,511 B2 | 10/2006 | Hewgill |
| 7,189,044 B2 | 3/2007 | Ball |
| 7,270,509 B2 | 9/2007 | Disantis et al. |
| 7,318,825 B2 | 1/2008 | Butler et al. |
| 7,374,495 B2 | 5/2008 | Ball |
| 7,621,943 B2 | 11/2009 | Michelson |
| 7,763,056 B2 | 7/2010 | Dalton |
| 7,857,839 B2 | 12/2010 | Duong et al. |
| 7,887,547 B2 | 2/2011 | Campbell et al. |
| 7,909,859 B2 | 3/2011 | Mosca et al. |
| 7,955,037 B2 | 6/2011 | Disantis et al. |
| 8,123,788 B2 | 2/2012 | Michelson |
| 8,262,711 B2 | 9/2012 | Hess |
| 8,366,365 B2 | 2/2013 | Disantis et al. |
| 8,727,684 B1 | 5/2014 | Woods |
| 8,784,027 B2 * | 7/2014 | Hess ............... F16B 39/12 411/326 |
| 9,435,370 B2 * | 9/2016 | Hughes ............... F16B 39/32 |
| 9,719,550 B2 * | 8/2017 | Stewart ............... F16B 39/32 |
| 10,094,413 B2 * | 10/2018 | Hess ............... F16B 39/12 |
| 10,125,807 B2 | 11/2018 | Furu-Szekely et al. |
| 10,215,217 B2 | 2/2019 | Hess |
| 2005/0207865 A1 | 9/2005 | Disantis et al. |
| 2005/0209599 A1 | 9/2005 | Brunsvold |
| 2006/0015104 A1 | 1/2006 | Dalton |
| 2009/0060682 A1 | 3/2009 | Yeh et al. |
| 2009/0192553 A1 | 7/2009 | Maguire et al. |
| 2010/0121383 A1 | 5/2010 | Stanaford et al. |
| 2011/0188970 A1 | 8/2011 | Dillon et al. |
| 2011/0274514 A1 | 11/2011 | Lee |
| 2012/0063864 A1 | 3/2012 | Hess |
| 2014/0190315 A1 | 7/2014 | Kiser |
| 2014/0314515 A1 | 10/2014 | Baker |
| 2014/0356097 A1 | 12/2014 | Hess et al. |
| 2016/0084291 A1 | 3/2016 | Stewart |
| 2016/0131175 A1 | 5/2016 | Hess |
| 2016/0305465 A1 | 10/2016 | Hess et al. |
| 2017/0067501 A1 | 3/2017 | Furu-Szekely et al. |
| 2017/0268561 A1 | 9/2017 | Hess et al. |

OTHER PUBLICATIONS

TineLok: Overview, www.tinelok.com (2013).
TineLok, The Revolutionary Vibration-Proof Fastener System, www.tinelok.com (2013).

* cited by examiner

LOCKING MECHANISMS WITH DEFLECTABLE LOCK MEMBER

BACKGROUND

The field of the disclosure relates generally to fasteners, and more specifically to locking mechanisms for threaded fasteners.

Fasteners commonly include mechanisms or design features for ensuring that fastener elements do not loosen over time, potentially allowing joined elements to loosen or separate. Examples of mechanisms include thread bore inserts and screw thread profiles that deform when tightened. Fasteners accessories like lock members, cotter pins, and lock wires are also commonly used with fasteners to prevent fastener elements from loosening. Adhesive materials, like epoxy, can be applied to fastener threads to stake fastener elements and prevent fastener elements from loosening. However, conventional fastener mechanisms, accessories, and adhesive materials may not be suitable for some applications, such as high temperature environments or with structures subject to extreme vibration.

Moreover, the time and cost required to manufacture fastener assemblies could be reduced. For example, at least some fastener mechanisms or accessories for ensuring that fastener elements do not loosen over time require custom or specialized manufacturing processes. Such processes can increase the time and cost required to manufacture fastener assemblies.

Accordingly, there is a need for an improved fastener assembly that do not loosen over time and can be produced using manufacturing processes that are less expensive and quicker than manufacturing processes for conventional fasteners.

BRIEF DESCRIPTION

In one aspect, a fastener assembly is provided. The fastener assembly includes a threaded member including a threaded body portion and a head portion. The fastener assembly also includes a first lock member including a plurality of axially-extending ratchet teeth and defining an aperture extending therethrough. The aperture is sized to receive the threaded body portion. The fastener assembly further includes a second lock member including a base portion configured to couple to the threaded member for rotation therewith and at least one spring finger extending axially from the base portion. The at least one spring finger has a proximal end joined to the base portion and a free end opposite the proximal end. The second lock member has a lock position in which the free end of the at least one spring finger is configured to engage the plurality of axially-extending ratchet teeth and an unlock position in which the free end of the at least one spring finger is spaced from the plurality of axially-extending ratchet teeth.

In another aspect, a locking mechanism for a fastener assembly is provided. The locking mechanism includes a first lock member including a plurality of axially-extending ratchet teeth and a body defining an aperture extending therethrough. The aperture is sized to receive a threaded member of the fastener assembly. The body has an inner circumferential surface, an outer circumferential surface, and an annular surface extending between the inner circumferential surface and the outer circumferential surface. The axially-extending ratchet teeth extend upward from the annular surface. The fastener assembly also includes a second lock member including an annular ring configured to couple to the threaded member for rotation therewith and a pair of spring fingers extending axially from the annular ring. Each spring finger of the pair of spring fingers has a proximal end joined to the annular ring and a free end opposite the proximal end. The second lock member has a lock position in which each free end is configured to engage the plurality of axially-extending ratchet teeth and an unlock position in which each free end is spaced from the plurality of axially-extending ratchet teeth.

In yet another aspect, a method of assembling a locking mechanism for a fastener including a threaded body portion is provided. The method includes providing a first lock member including a plurality of axially-extending ratchet teeth. The first lock member defines a first aperture extending therethrough. The first aperture is sized to receive the threaded body portion. The method also includes forming a base portion of a second lock member. The base portion defines a second aperture extending therethrough. The second aperture is sized to receive the threaded body portion. The method further includes forming at least one spring finger of the second lock member. The at least one spring finger has a proximal end joined to the base portion and a free end opposite the proximal end. The method also includes bending the at least one spring finger at an angle relative to the base portion such that the at least one spring finger extends axially from the base portion. The second lock member is positionable between a lock position in which the free end of the at least one spring finger is configured to engage the plurality of axially-extending ratchet teeth and an unlock position in which the free end of the at least one spring finger is spaced from the plurality of axially-extending ratchet teeth. The base portion and the at least one spring finger are a single piece.

In still another aspect, a fastener assembly is provided. The fastener assembly includes a threaded member including a threaded body portion, a nut configured to threadably engage the threaded body portion, a first lock member, and a second lock member. The first lock member includes a plurality of axially-extending ratchet teeth and defines an aperture extending therethrough. The aperture is sized to receive the threaded body portion. The first lock member includes at least one anti-rotation structure configured to rotationally fix the first lock member with respect to the threaded member. The second lock member includes a base portion configured to couple to the nut for rotation therewith and at least one spring finger extending axially from the base portion. The at least one spring finger has a proximal end joined to the base portion and a free end opposite the proximal end. The second lock member has a lock position in which the free end of the at least one spring finger is configured to engage the plurality of axially-extending ratchet teeth and an unlock position in which the free end of the at least one spring finger is spaced from the plurality of axially-extending ratchet teeth.

In another aspect, a fastener assembly is provided. The fastener assembly includes a threaded member including a threaded body portion. The fastener assembly also includes a first lock member and a second lock member. The first lock member includes a plurality of radially-extending ratchet teeth and defines an aperture extending therethrough. The aperture is sized to receive the threaded body portion. The first lock member includes at least one anti-rotation structure configured to rotationally fix the first lock member with respect to the threaded member. The second lock member includes an inner portion defining an aperture extending therethrough. The aperture is sized to receive the threaded body portion. The second lock member also includes an outer portion including at least one tab extending axially from the inner portion. The at least one tab has a proximal end joined to the inner portion and a free end opposite the proximal end. The second lock member has a lock position in which the free end of the at least one tab is configured to engage the plurality of radially-extending ratchet teeth and an unlock position in which the free end of the at least one tab is spaced from the plurality of radially-extending ratchet teeth.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
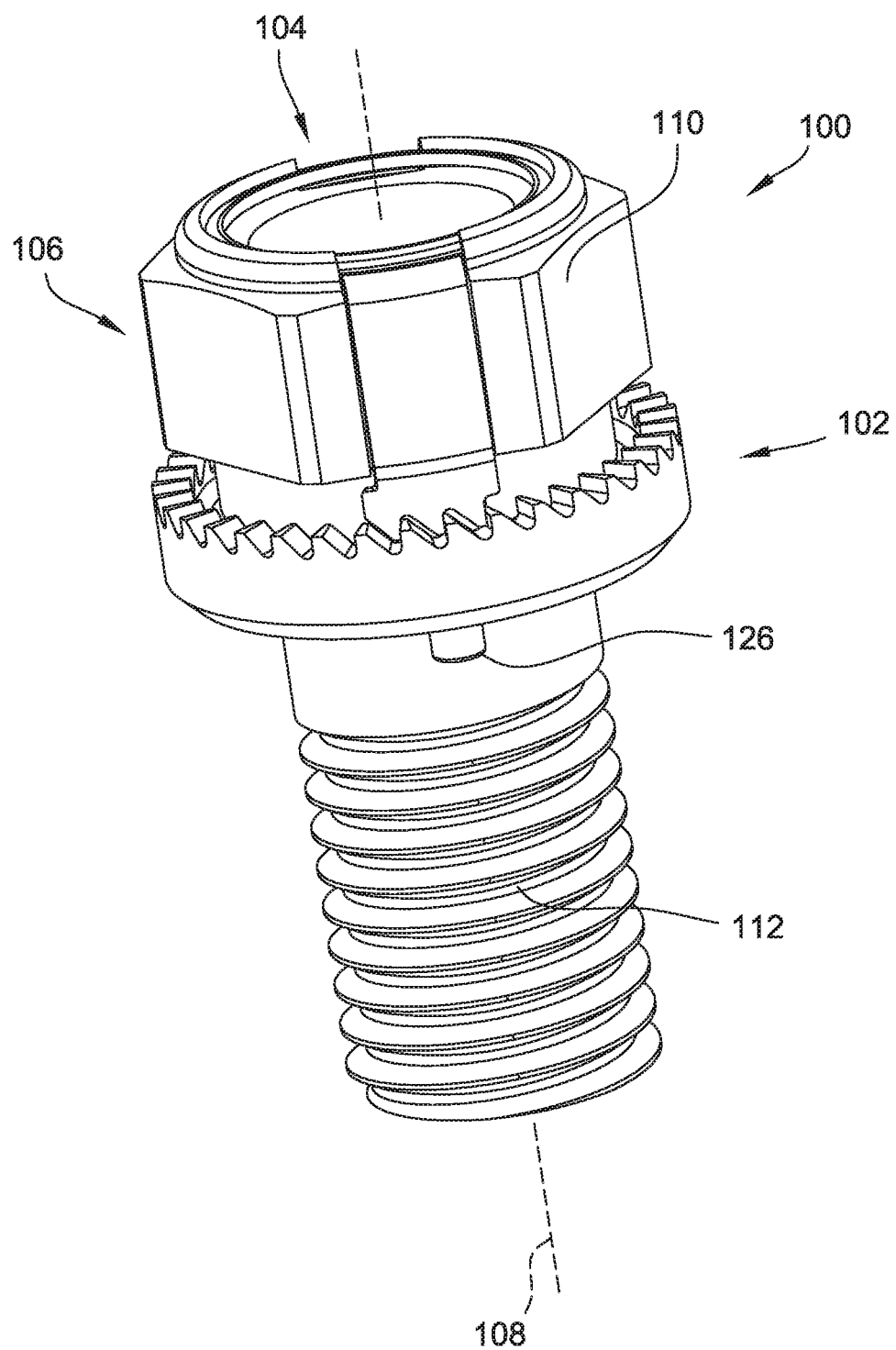
FIG. 1 is a perspective view of an exemplary embodiment of a fastener assembly including a first lock member and a second lock member, the second lock member is in a lock position and is engaged with the first lock member.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptions herein such as axial, radial, upward, downward, left, right, up, down, length, height, width, thickness and the like are with reference to the Figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

Embodiments described herein are implemented and utilized in numerous ways, including without limitation as a process, an apparatus, a system, a device, a method of installation and removal, and a method for applications now known and later developed. These and other unique features of the technology described herein will become more readily apparent from the following description and the accompanying drawings.

The fastening devices and systems described herein provide many advantages over known fastening devices and systems. In general, threaded fasteners are used to fixedly connect two or more components in a variety of applications such as, without limitation, surgical implants, industrial applications, aerospace applications, and building applications. Among other features and benefits, the disclosed fastening devices and systems facilitate one or more of quick and easy installation and/or removal, reduced torque requirements, vibration resistant secured tightness, and/or single end access for blind fastening applications.

In some embodiments, a locking mechanism includes an elongated threaded member having a threaded segment, a lock member having axially-extending engagement teeth, a first lock member having an aperture to receive the threaded member and a plurality of ratchet teeth, and a second lock member having an annular body with an upstanding spring finger and at least one tooth configured to engage the ratchet teeth of the first lock member. In some embodiments, a spring finger of the second lock member cooperates with an axial slot coupled to the threaded segment of the threaded member to fix the lock member in rotation relative to the threaded member. In other embodiments, one of the first lock member or the second lock member includes one or more engagement features that engage the threaded member and allow rotation only therewith. The tooth of the second lock member is displaceable radially or axially relative to the first lock member for engaging and disengaging the engagement teeth. In a lock position, the tooth of the second lock member intermeshes with the ratchet teeth to prevent rotation of the first lock member relative to the second lock member in at least one direction. In an unlock position, the second lock member is rotatable relative to the first lock member such that the second lock member and the threaded member are rotatable relative to the first lock member.

In further embodiments, the threaded member can include a flat or two or more flats or other features designed to prevent rotation of the first or second lock member in relation to the threaded member. The flat can extend axially along a length of threaded member. The banking feature of the threaded member can include the flat. The flat can be radially adjacent to the threaded segment of the threaded member. The flat can be a first flat, and the threaded member can include one or more second flats. The banking feature can include both the first flat and the second flat. The second flat can extend axially along the threaded member. The second flat can be disposed on a side of the threaded member diametrically opposite the first flat. The threaded segment can extend circumferentially about the threaded member and couple the first flat with the second flat.

Also, in some embodiments, the first or second lock member can have opposed axial surfaces separated by an axial thickness of the lock member. Engagement teeth can extend axially away from at least one of the axial surfaces. Alternatively, the engagement teeth can be disposed on a radial surface of a circumferential wall and extend radially from the circumferential wall. A central aperture can extend through the thickness of the lock member between the axial surfaces of the lock member. The central aperture can include the banking portion that complements the banking feature of the threaded member. For example, one or more flat segments can bound the central aperture. The flat segment can correspond with the banking feature of the threaded member. The central aperture can include one or more arcuate segments bounding the central aperture. The arcuate segment can correspond to the threaded segment(s) of the threaded member. The central aperture can include both flat and arcuate segments, and a stress reduction feature can be disposed at an intersection of a flat segment and an arcuate segment.

In addition, in some embodiments, the first or second lock member can include a spring finger having a free end and a proximal end. The proximal end can be connected to the annular body of the lock member. A tooth and the spring finger can be circumferentially aligned with one another. The annular body of the lock member can have a round, oval, square, rectangular, or any suitably shaped axial profile. The spring finger can be displaced in response to inward force exerted on the spring finger at a location between the fixed and free ends of the spring finger. The spring finger can be a first spring finger, and the lock member can include a second spring finger connected to the annular body on a side of the annular body opposite the first spring finger.

Moreover, in further embodiments, the first or second lock member can have first and second teeth that each extend axially outward or radially outward from a spring tab or finger coupled to the annular body. The teeth can be disposed on the free end of the spring finger spaced from the annular body. It is also contemplated that more than one circumferentially adjacent tooth can be on a first spring finger, and that more than one circumferentially adjacent tooth can be on a second spring finger.

In some embodiments, a nut member or head of the threaded member can have a cavity arranged to receive the annular body of the lock member. The nut member or head can have a circumference with a plurality of faces. The plurality of faces of the nut member or head can form a hexagonal circumference extending about the nut member or head. One or more of the faces of the nut member or head can have an axial slot. The axial slot can extend between the cavity and an end of the nut member or head opposite the cavity. It is contemplated that the nut member or head can have faces with axial slots disposed on faces that are diametrically opposed to one another.

In addition, in some embodiments, the threaded member, the first lock member, and the second lock member can cooperate as a locking mechanism. The locking mechanism can have a lock position wherein the spring finger of the second lock member urges the teeth into engagement with the engagement teeth of the first lock member, fixing the second lock member in rotation relative to the first lock member and preventing loosening of the fastening mechanism. The locking mechanism can have a tighten or unlock position wherein the teeth on the spring finger of the second lock member are disengaged from the teeth of the first engagement member, rendering the second lock member rotatable relative to the first lock member.

Also, in some embodiments, a spinal fixation system includes a fastener locking mechanism as described above and a rod. The rod seats in the threaded member and below the lock member. It is contemplated that tightening the nut member exerts force on the lock member which in turn presses the rod against the threaded member.

In addition, in some embodiments, the threaded member can have a head portion coupled to an end of a stem section. The head portion can be fixed relative to the stem portion. A joint can be interposed between the head portion and the stem portion, the head portion thereby being movable relative to the stem portion. The head portion can be pivotable relative to the stem portion, such as in a conical movement envelope. The head portion can have a first threaded segment and the stem portion can have a second threaded segment. The first threaded segment can be a male threaded segment corresponding to a female threaded segment defined by the bore of the nut member. The second threaded segment can taper between an end adjacent to the head member and an end of the stem portion opposite the head portion. It is contemplated that the second threaded segment can have threads adapted for seating the threaded member to a bone structure, such as a pedicle.

Moreover, in some embodiments, the threaded member can include a tulip head. The tulip head can have a slot extending therethrough for seating the rod. The slot can be centrally disposed, extending across the top of the threaded member. The slot can be laterally disposed, extending across a side of the threaded member. Lobes can be defined on opposite sides of the slot. The lobes can have the banking feature of the threaded member defined thereon. The lobes can have the threaded segment of the threaded member defined thereon. In a contemplated exemplary embodiment, each lobe has portions of both the threaded segment and the banking feature defined thereon.

In addition, in further embodiments, the first or second lock member can include a central bar portion. The central bar portion can extend across the lock member central aperture and divide the central aperture into first and second portions. One lobe of the threaded member tulip head can extend through the first portion of the central aperture, and another lobe of the threaded member tulip head can extend through the second portion of the central aperture. The central bar portion can extend from the banking portion of the lock member, if present, such that, when the central bar portion is seated with the slot of the tulip head, the lock member is fixed in rotation relative to the tulip head. It is contemplated that central bar portion can seat in the slot of the tulip head, overlay the rod, and can be disposed between the nut member, lock member, and the stem of the threaded member.

In embodiments described herein, a fastener mechanism includes an elongated threaded member and at least one lock member. For example, a first lock member may be coupled to a head of the threaded member or a lock nut for rotation therewith. In some embodiments, the fastener mechanism includes a second lock member that engages the first lock member to allow rotation of the threaded member in a first direction and prevent rotation of the threaded member in a second direction. At least one of the first and second lock members includes at least one tab or spring finger that is positionable to switch the lock member between a lock position in which a free end of the at least one tab or spring finger is configured to engage a plurality of ratchet teeth and an unlock position in which the free end is spaced from the plurality of ratchet teeth. In some embodiments, the at least one tab or finger is integrally formed with the first or second lock member and allows the fastener mechanism to be at least partially formed using a stamping process. As a result, the time and cost required to assemble the fastener locking mechanism is reduced in comparison to at least some known fastener mechanisms.

Figure 2:
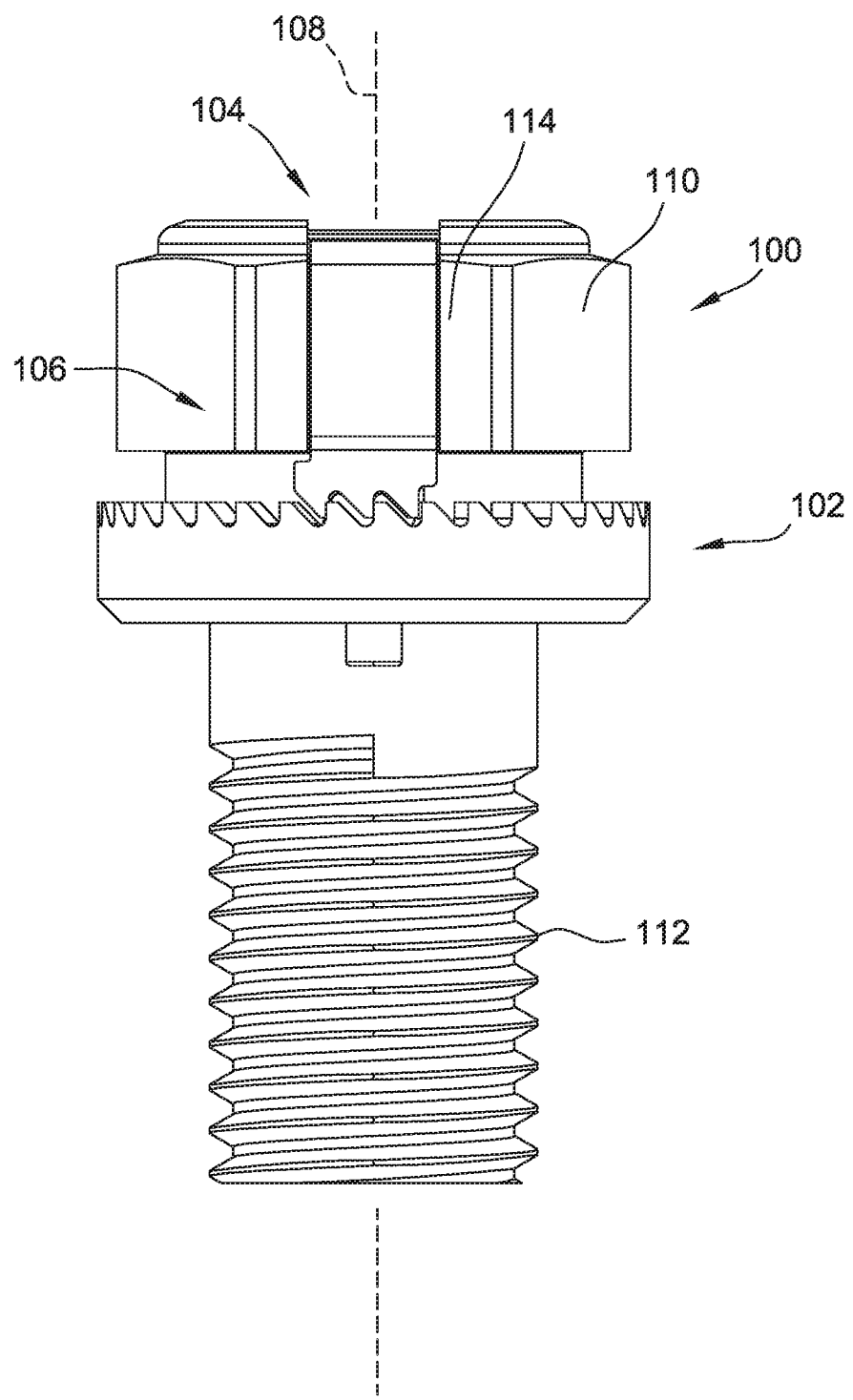
FIG. 2 is a side view of the fastener assembly shown in FIG. 1.
Figure 3:
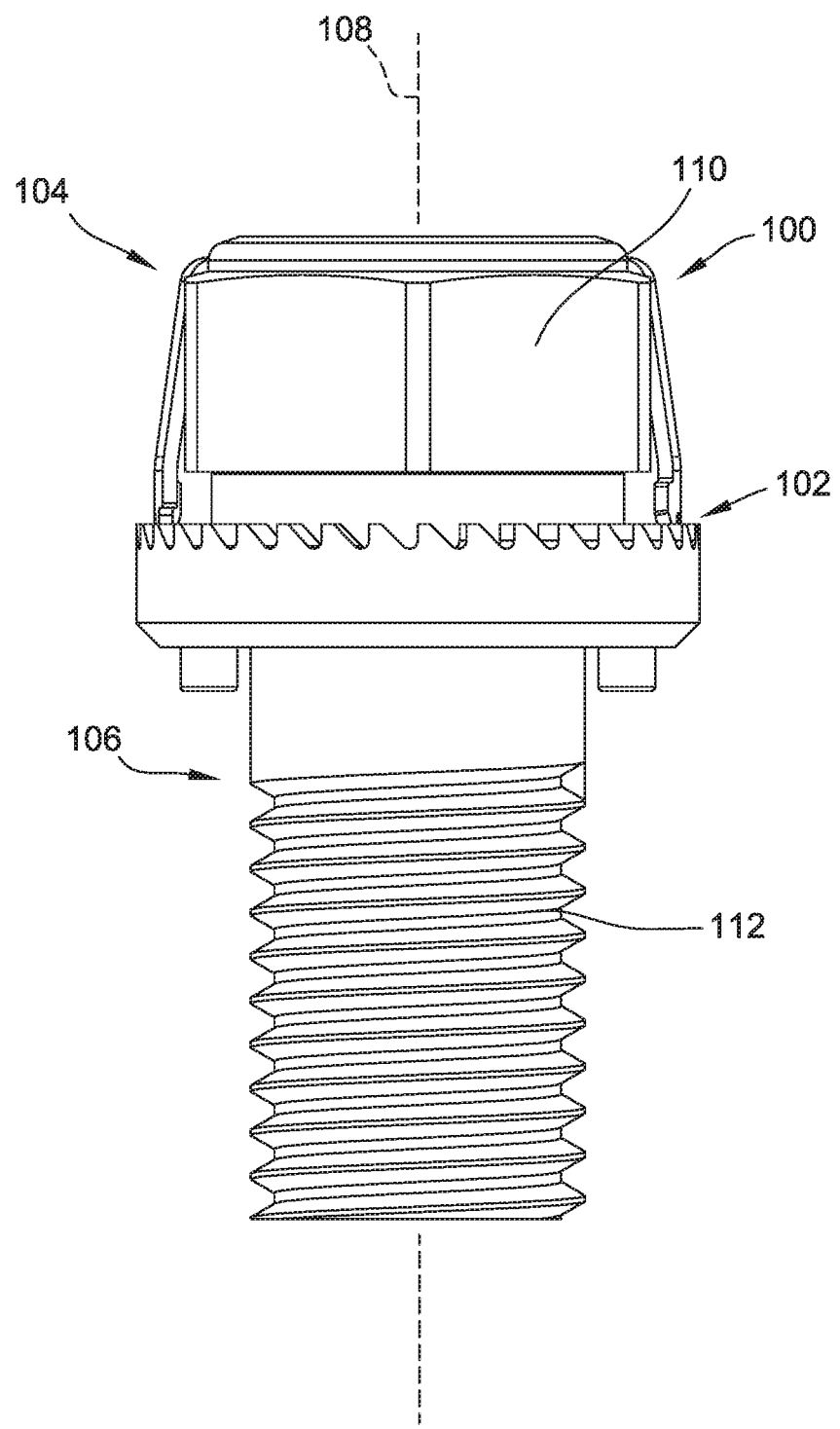
FIG. 3 is a front view of the fastener assembly shown in FIGS. 1 and 2.
Figure 4:
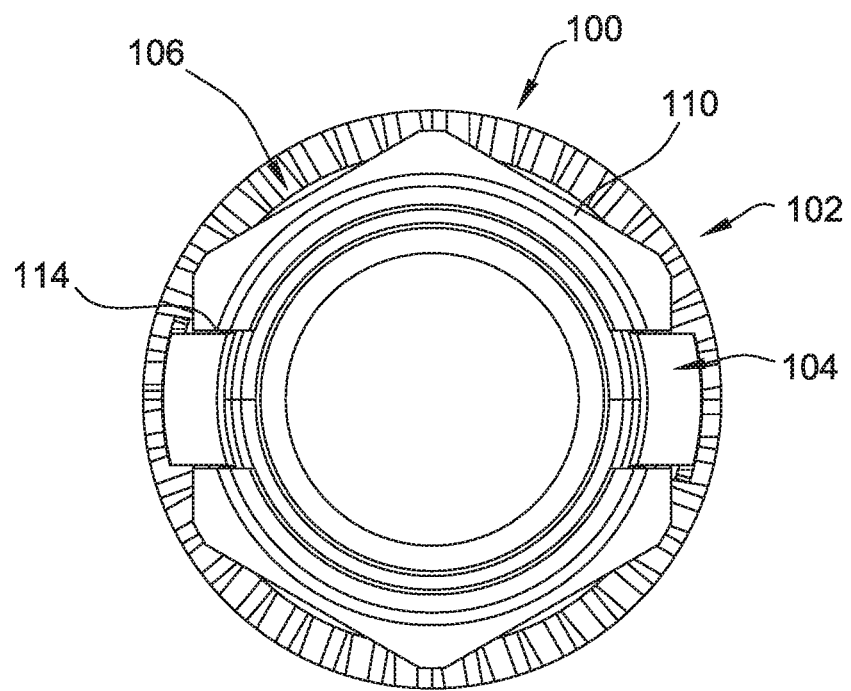
FIG. 4 is a top view of the fastener assembly shown in FIGS. 1-3.
Figure 5:
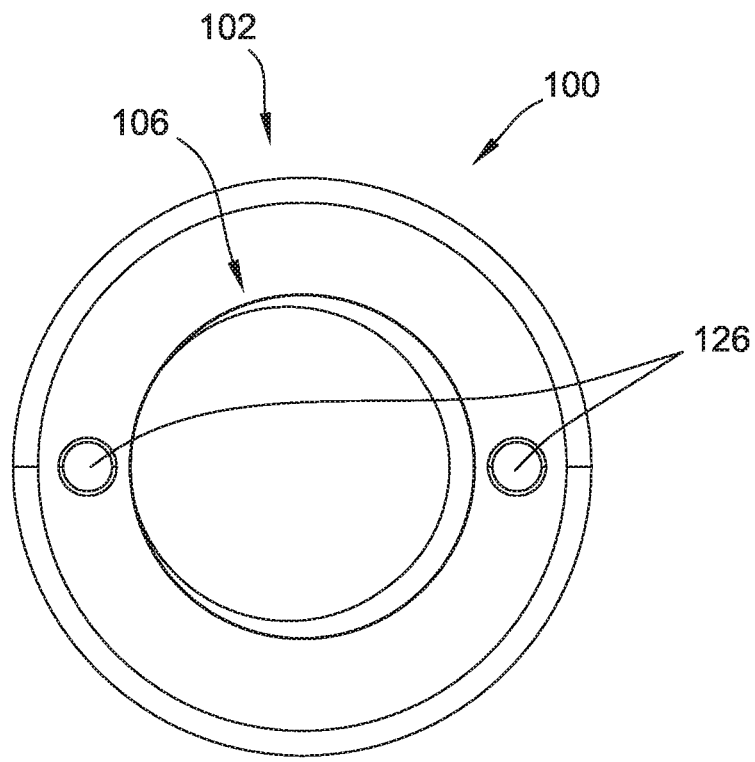
FIG. 5 is a bottom view of the fastener assembly shown in FIGS. 1-4.

FIG. 1 is a perspective view of an exemplary embodiment of a fastener assembly 100 including a first lock member 102 and a second lock member 104. FIG. 2 is a side view of fastener assembly 100. FIG. 3 is a front view of fastener assembly 100. FIG. 4 is a top view of fastener assembly 100. FIG. 5 is a bottom view of the fastener assembly 100. In the exemplary embodiment, fastener assembly 100 includes a first lock member 102, a second lock member 104, and a threaded member 106. Threaded member 106 extends along an axis 108. As used herein, the terms "axial" and "axially" refer to a direction parallel to axis 108. The terms "radial" and "radially" refer to a direction perpendicular to axis 108. Threaded member 106 includes a head portion 110 and an elongated threaded body portion 112 extending axially from head portion 110. Alternatively, threaded member 106 may be free of head portion 110. For example and without limitation, threaded member 106 may be a bolt, a screw, or any other threaded component that enables fastener assembly 100 to function as described herein.

In the exemplary embodiment, head portion 110 is a hexagonal head. Alternatively, head portion 110 is any form, for example and without limitation, a spline head, a socket cap, a tulip head, and a pan head, that enables fastener assembly 100 to function as described herein.

Also, in the exemplary embodiment, second lock member 104 is configured to releasably couple to head portion 110 of threaded member 106 for rotation therewith. In alternative embodiments, second lock member 104 is coupled to head portion 110 in any manner that enables fastener assembly 100 to function as described herein. For example, in some embodiments, second lock member 104 is permanently attached to head portion 110. In further embodiments, second lock member 104 and head portion 110 are integrally formed as a single piece.

In addition, in the exemplary embodiment, head portion 110 includes anti-rotation features to prevent rotation of second lock member 104 relative to threaded member 106. Anti-rotation features include, for example and without limitation, flats, notches, grooves, slots, or any other feature that enables threaded member 106 to function as described herein. In the exemplary embodiment, anti-rotation features include a pair of opposing longitudinally extending slots formed in head portion 110. Slots 114 are substantially equal in size and shape, and extend along the entire length of head portion 110. In alternative embodiments, threaded member 106 includes any anti-rotation features that enable threaded member 106 to operate as described herein. For example, in some embodiments, anti-rotation features are formed at least partially in threaded body portion 112.

In the exemplary embodiment, threaded member 106, first lock member 102, and second lock member 104 are fabricated from a metal, for example and without limitation, steel, aluminum, titanium, or a superalloy. Alternatively, threaded member 106, first lock member 102, and second lock member 104 are fabricated from any material that enables fastener assembly 100 to function as described herein, such as, without limitation, composite materials, resins, fiber reinforced resins, plastics, and fiber reinforced plastics.

Figure 6:
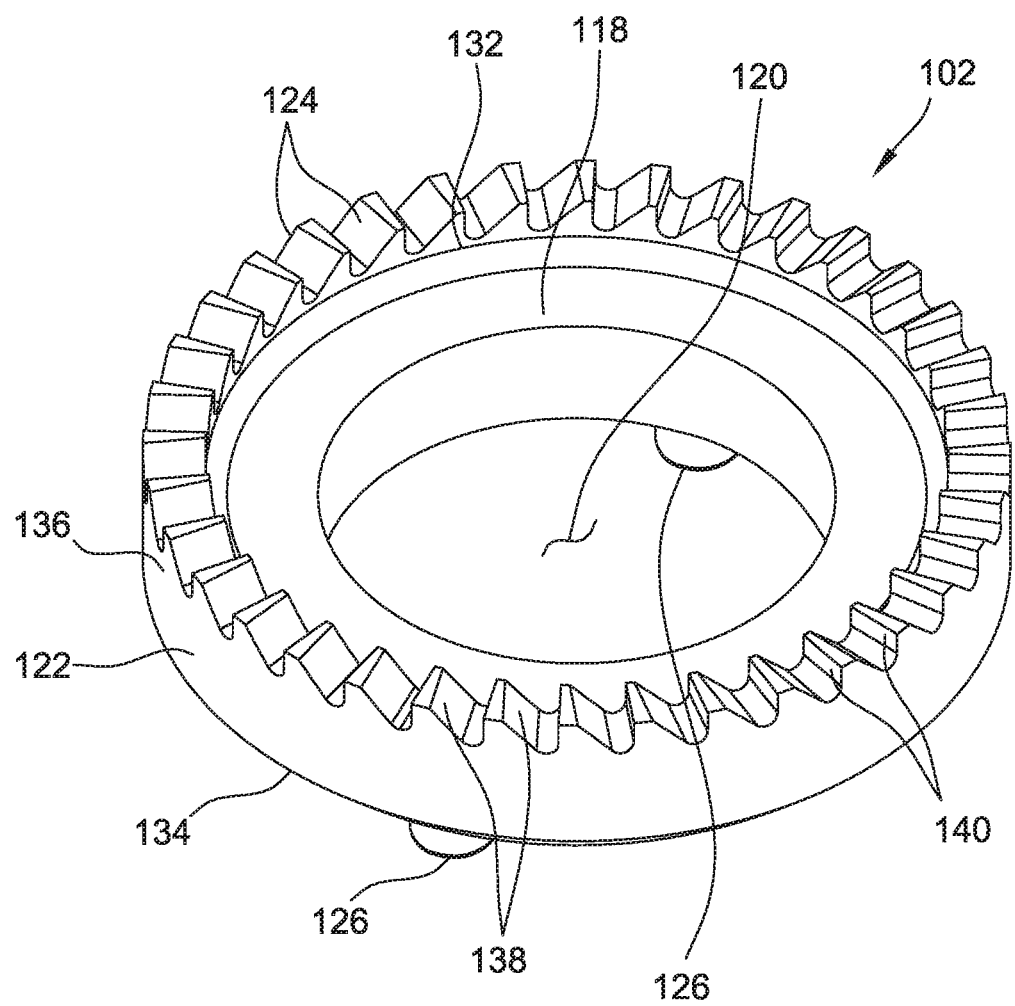
FIG. 6 is a perspective view of a first lock member of the fastener assembly shown in FIGS. 1-5.

FIG. 6 is a perspective view of first lock member 102 of fastener assembly 100 (shown in FIG. 1). First lock member 102 includes an inner portion 118 defining an axial aperture 120 therethrough and an outer portion 122 having a plurality of axially-extending teeth 124. Axial aperture 120 is sized to facilitate freely sliding lock member 104 onto threaded body portion 112 of threaded member 106 (shown in FIG. 1). As such, axial aperture 120 has a diameter slightly greater than a diameter of threaded body portion 112 (shown in FIG. 5). First lock member 102 also includes an anti-rotation structure. The anti-rotation structure includes, for example and without limitation, a member, indent, wedge, or any other component configured to engage another anti-rotation feature. In the exemplary embodiment, the anti-rotation features include a pair of pins 126 extending downward from inner portion 118 of first lock member 102. Pins 126 are received within openings 128 defined in panel 130 (shown in FIG. 10) to rotationally fix first lock member 102 relative to panel 130 when fastener assembly 100 is tightened against panel 130. In alternative embodiments, first lock member 102 includes any anti-rotation features that enable first lock member 102 to function as described herein. For example, in some embodiments, first lock member 102 includes one or more axial or radial features such as engagement surfaces that constrain rotation of first lock member 102.

In the exemplary embodiment, outer portion 122 includes an upper surface 132, a lower surface 134, and a radially outer surface 136 extending axially between upper surface 132 and lower surface 134. Axially-extending teeth 124 extend upward from upper surface 132. Specifically, axially-extending teeth 124 extend upward from upper surface 132 along an entire circumference of first lock member 102 and form a continuous ring. In the exemplary embodiment, each tooth 124 includes a sloped surface 138 and an engagement surface 140 extending in the axial direction. As a result, opposing teeth are able to travel over teeth 124 along sloped surface 138 in one circumferential direction but are prevented from traveling in the opposite direction by engagement surface 140. Accordingly, teeth 124 are ratchet teeth that allow ratcheting movement of opposed teeth when the teeth are engaged. In alternative embodiments, outer portion 122 includes any teeth 124 that enable first lock member 102 to function as described herein.

Figure 7:
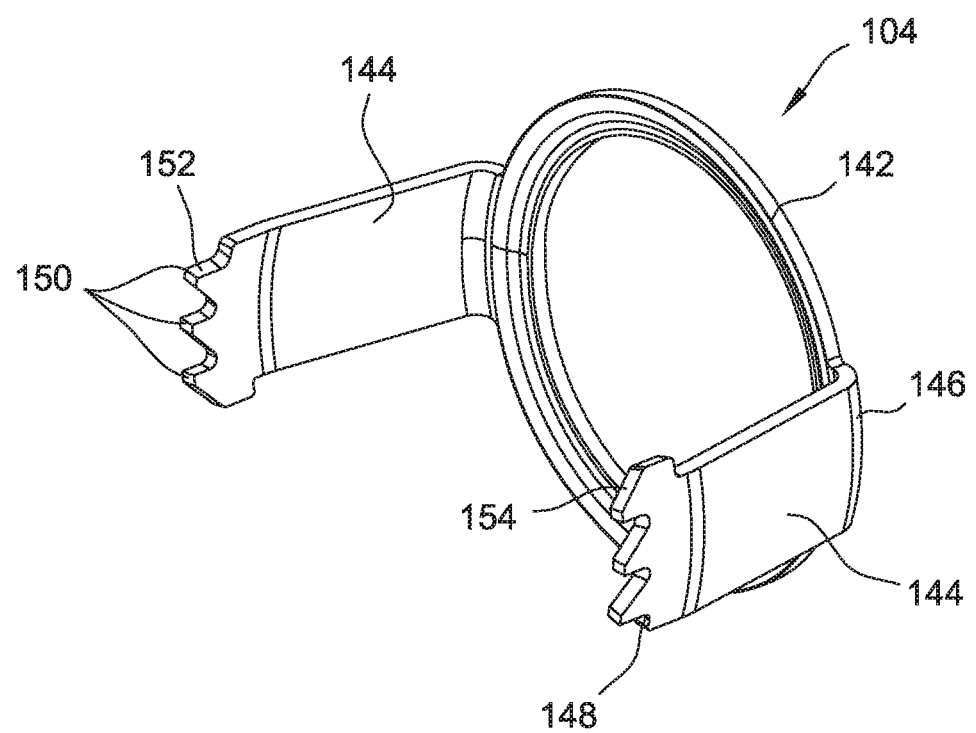
FIG. 7 is a perspective view of a second lock member of the fastener assembly shown in FIGS. 1-5.

FIG. 7 is a perspective view of second lock member 104 of fastener assembly 100 (shown in FIGS. 1-5). Second lock member 104 includes an annular body 142 and one or more spring fingers 144. In the illustrated embodiment, annular body 142 has a ring-like shape. It is contemplated that annular body 142 may be round, oval, ellipsoid, or any other suitable shape, and may be constructed from a resilient material, such as an elastomer or spring steel. In response to a radial force exerted thereon by one or more spring fingers 144, annular body 142 may become more or less round depending upon the amount of radial force exerted on annular body 142 and the spring constant of second lock member 104.

In the exemplary embodiment, second lock member 104 includes a pair of spring fingers 144. Each spring finger 144 extends axially from annular body 142 and extends between a proximal end 146 and a free end 148. Proximal end 146 is joined to annular body 142. Each spring finger 144 extends radially outward from proximal end 146 such that free end 148 is disposed radially outward of proximal end 146. In the illustrated embodiment, spring fingers 144 extend from diametrically opposite sides of annular body 142. Free ends 148 of spring fingers 144 are biased outward such that lock member 104 is in the lock position when no external forces act on lock member 104, i.e., when lock member 104 is at rest. Free ends 148 define a maximum width of second lock member 104 when second lock member 104 is in a lock position. In alternative embodiments, second lock member 104 includes any spring finger 144 that enables second lock member 104 to function as described herein. For example, in some embodiments, second lock member 104 includes one spring finger 144 or three or more spring fingers 144.

Also, in the exemplary embodiment, at least one axially-extending tooth 150 is disposed on free end 148 of each spring finger 144. Each tooth 150 includes an engagement surface 152 and a sloped surface 154 that correspond to sloped surfaces 138 and engagement surfaces 140 of first lock member 102 (shown in FIG. 6). In the illustrated embodiment, each free end 148 includes a plurality of teeth 150 that are configured to engage teeth 124 (shown in FIG. 6) when fastener assembly 100 (shown in FIG. 1) is in a lock configuration. In alternative embodiments, second lock member 104 includes any teeth 150 that enable second lock member 104 to function as described herein.

Figure 8:
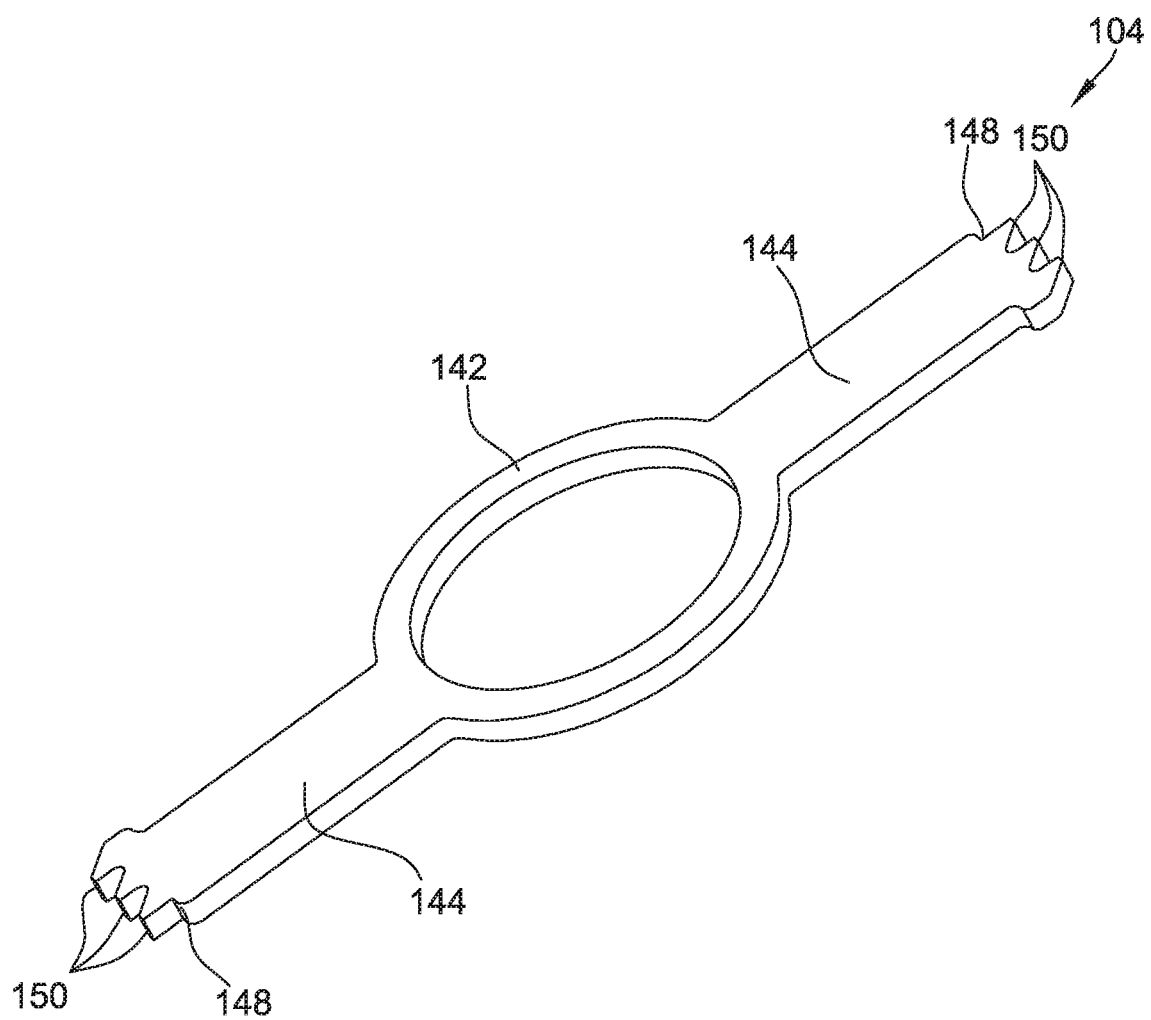
FIG. 8 is a perspective view of the second lock member shown in FIG. 6 in a laid flat configuration.

FIG. 8 is a perspective view of second lock member 104 in a laid flat configuration. In the exemplary embodiment, second lock member 104 is formed in the laid flat configuration from a sheet of material such as, for example and without limitation, steel, aluminum, titanium, or a superalloy. After forming the laid flat configuration, spring fingers 144 of second lock member 104 are bent at an angle relative to annular body 142 and positioned to extend axially from annular body 142. Accordingly, second lock member 104 is able to be assembled using a stamping process at a reduced cost in comparison to at least some known lock members.

Figure 9:
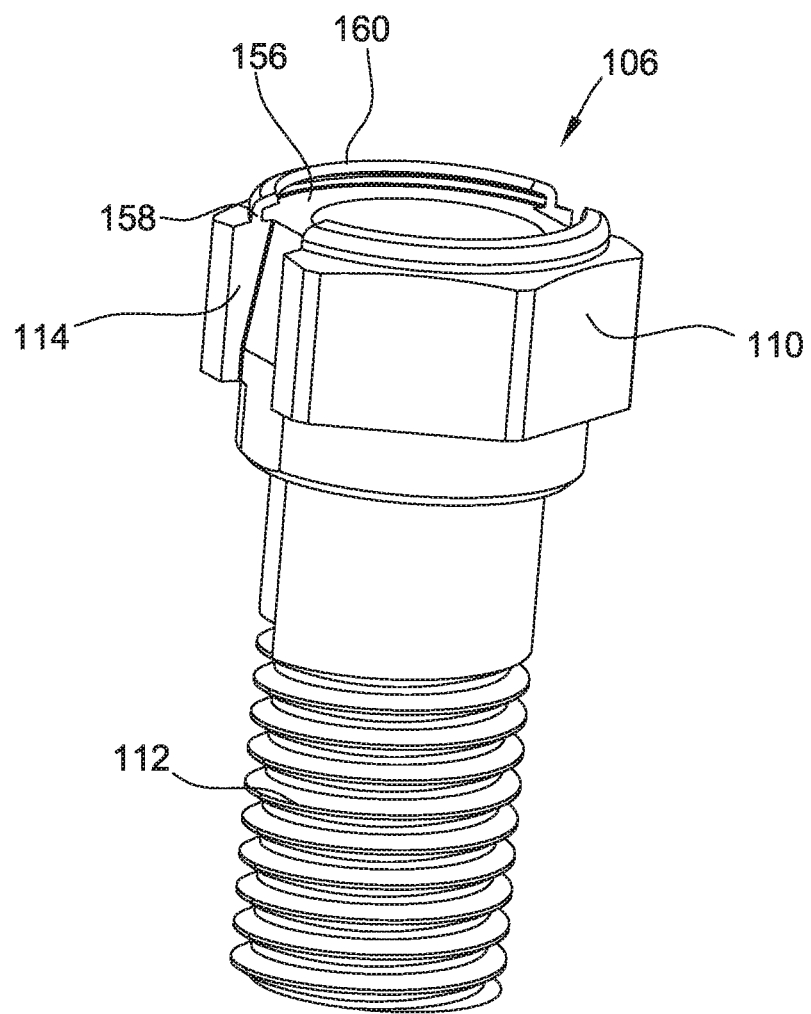
FIG. 9 is a perspective view of a threaded member of the fastener assembly shown in FIGS. 1-5.

FIG. 9 is a perspective view of threaded member 106 of fastener assembly 100 (shown in FIGS. 1-5). Head portion 110 of threaded member 106 has a cavity 156 and is configured to receive second lock member 104 (shown in FIG. 7) such that annular body 142 (shown in FIG. 7) is positioned in cavity 156 and spring fingers 144 (shown in FIG. 7) extend through slots 114. Cavity 156 is circular and has a diameter greater than a diameter of annular body 142. A circumferential lip 158 extends axially from a top of head portion 110 around cavity 156. A collar 160 extends radially inward from lip 158 and is sized to extend at least partially over second lock member 104 (shown in FIG. 7) to secure annular body 142 in cavity 156 when annular body 142 is positioned in cavity 156. Second lock member 104 (shown in FIG. 7) is at least partially compressible to allow positioning of second lock member 104 in cavity 156 through the opening defined by collar 160. In alternative embodiments, second lock member 104 is coupled to threaded member 106 in any manner that enables fastener assembly 100 to function as described herein.

Figure 10:
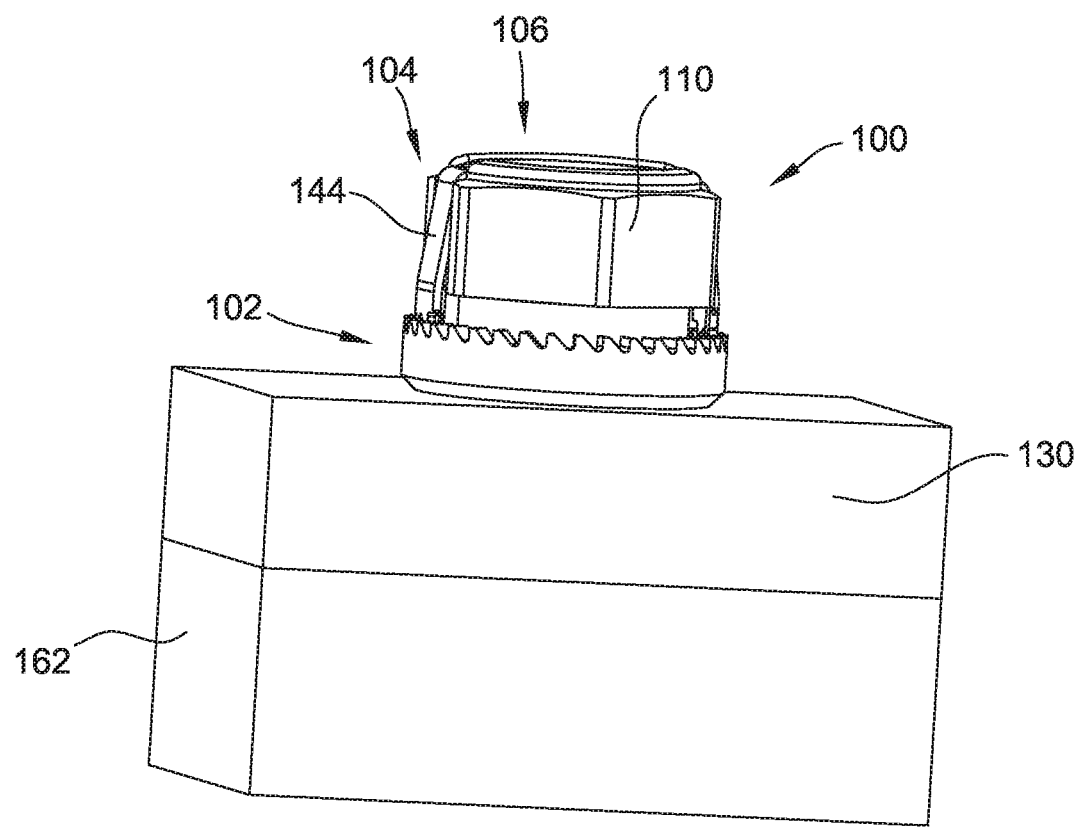
FIG. 10 is a perspective view of the fastener assembly shown in FIGS. 1-5 and two components coupled together by the fastener assembly.
Figure 11:
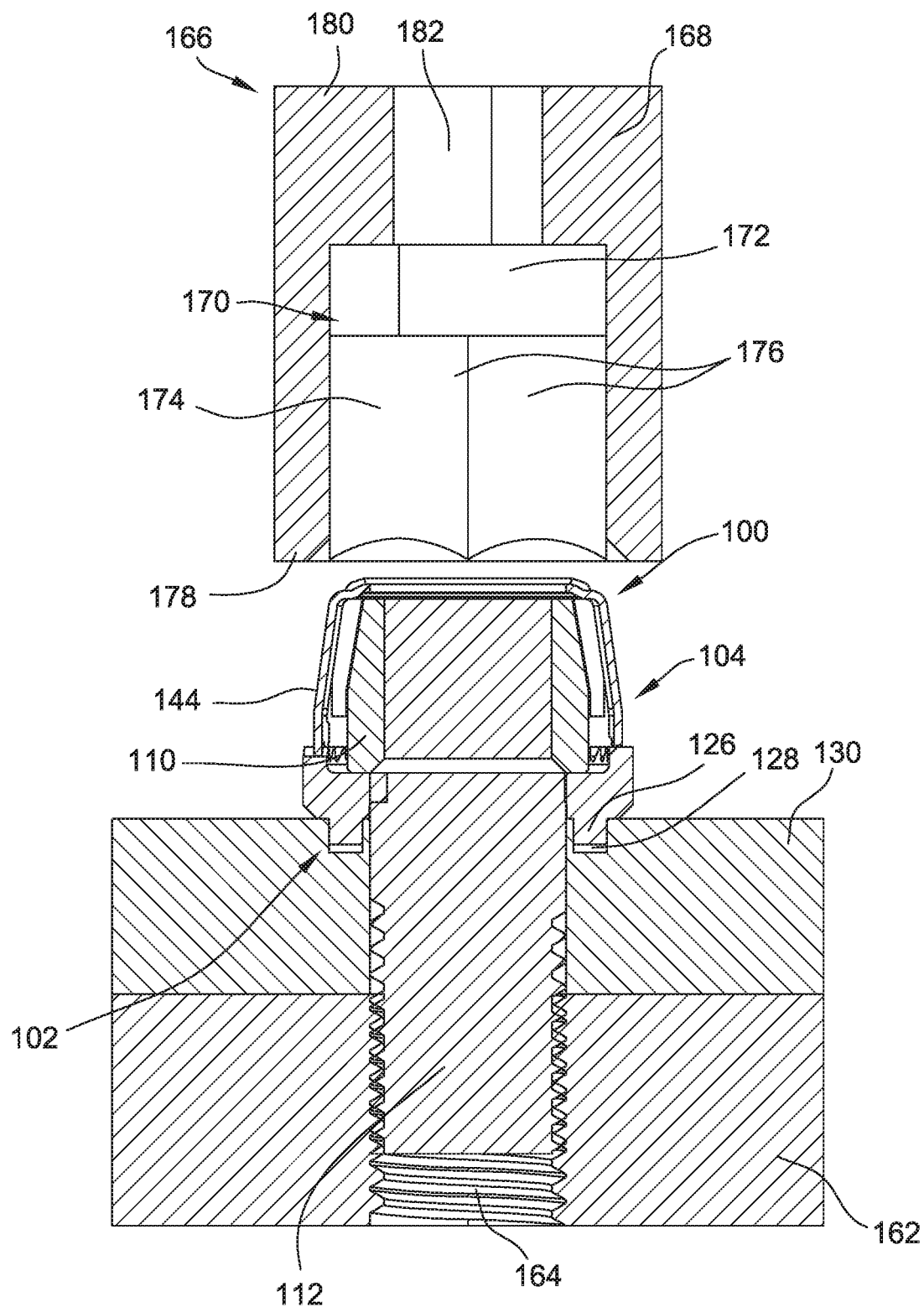
FIG. 11 is a sectional view of the fastener assembly coupling the components shown in FIG. 10, the second lock member of the fastener assembly is in the lock position.

FIG. 10 is a perspective view of fastener assembly 100 and two components coupled together by fastener assembly 100. FIG. 11 is a sectional view of the components and fastener assembly 100 with second lock member 104 in the lock position. Fastener assembly 100 is able to couple many types of components together. For example, fastener assembly 100 is used to couple panel 130 to a substrate 162. Fastener assembly 100 is positioned through openings 128 in panel 130 and threaded into a threaded bore 164 of substrate 162 to secure panel 130 to substrate 162. First lock member 102 engages anti-rotation structures, e.g., openings 128, of panel 130 to prevent rotation of first lock member 102 relative to panel 130 as first lock member 102 is pressed against panel 130. Fastener assembly 100 has a lock position that prevents loosening of fastener assembly 100 when fastener assembly 100 is tightened against panel 130. For example, second lock member 104 is coupled to threaded member 106 for rotation therewith. Second lock member 104 is in the lock position in which second lock member 104 engages first lock member 102 to prevent rotation of second lock member 104 and threaded member 106 relative to first lock member 102. Specifically, teeth 150 on spring fingers 144 engage teeth 124 of first lock member 102. The engagement of teeth 150 and teeth 124 allow tightening of fastener assembly 100 in threaded bore 164 but prevent threaded member 106 from rotating in the opposite direction.

Figure 12:
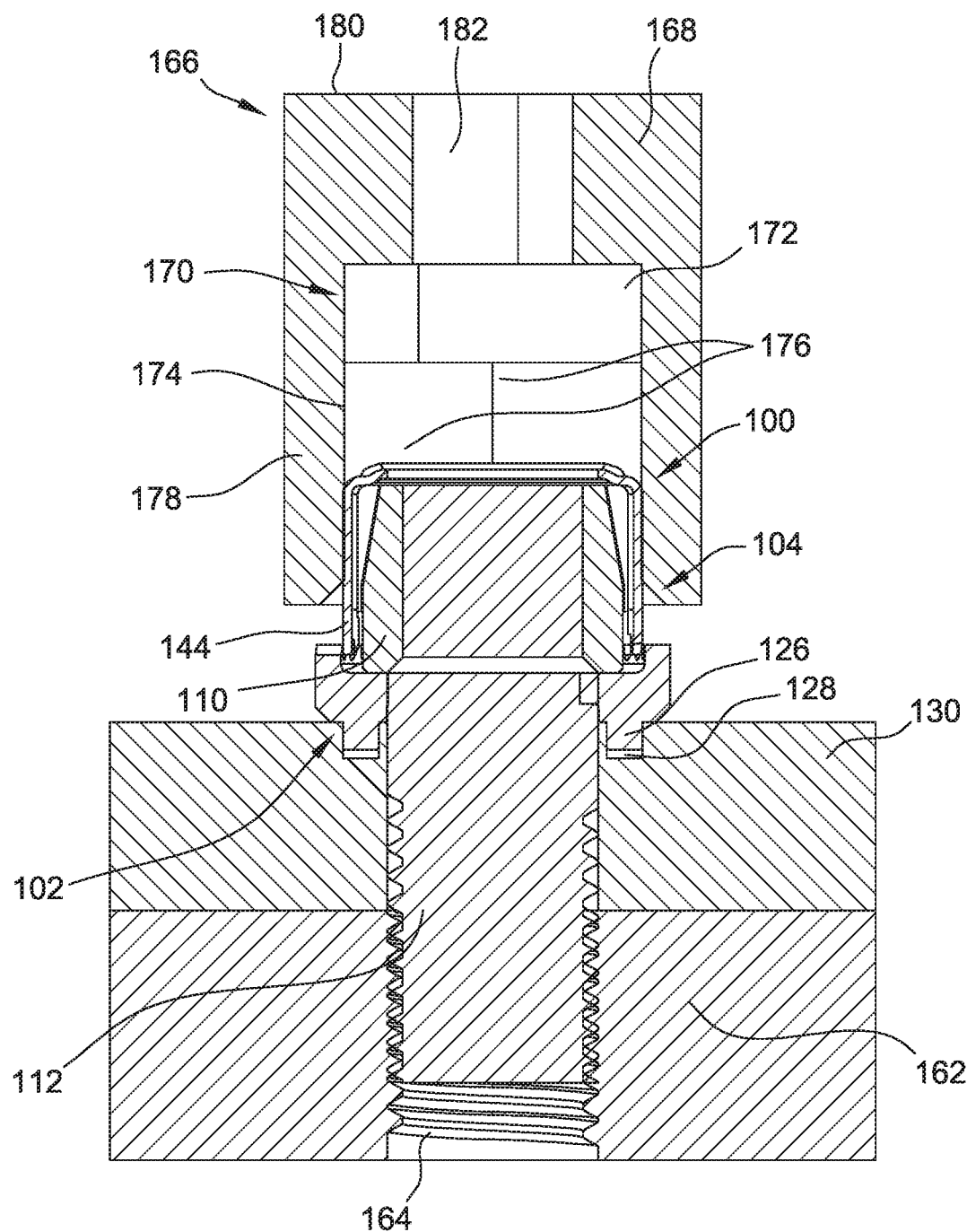
FIG. 12 is a sectional view of the fastener assembly coupling the components shown in FIG. 10, and a tool for positioning the second lock member of the fastener assembly in an unlock position.
Figure 13:
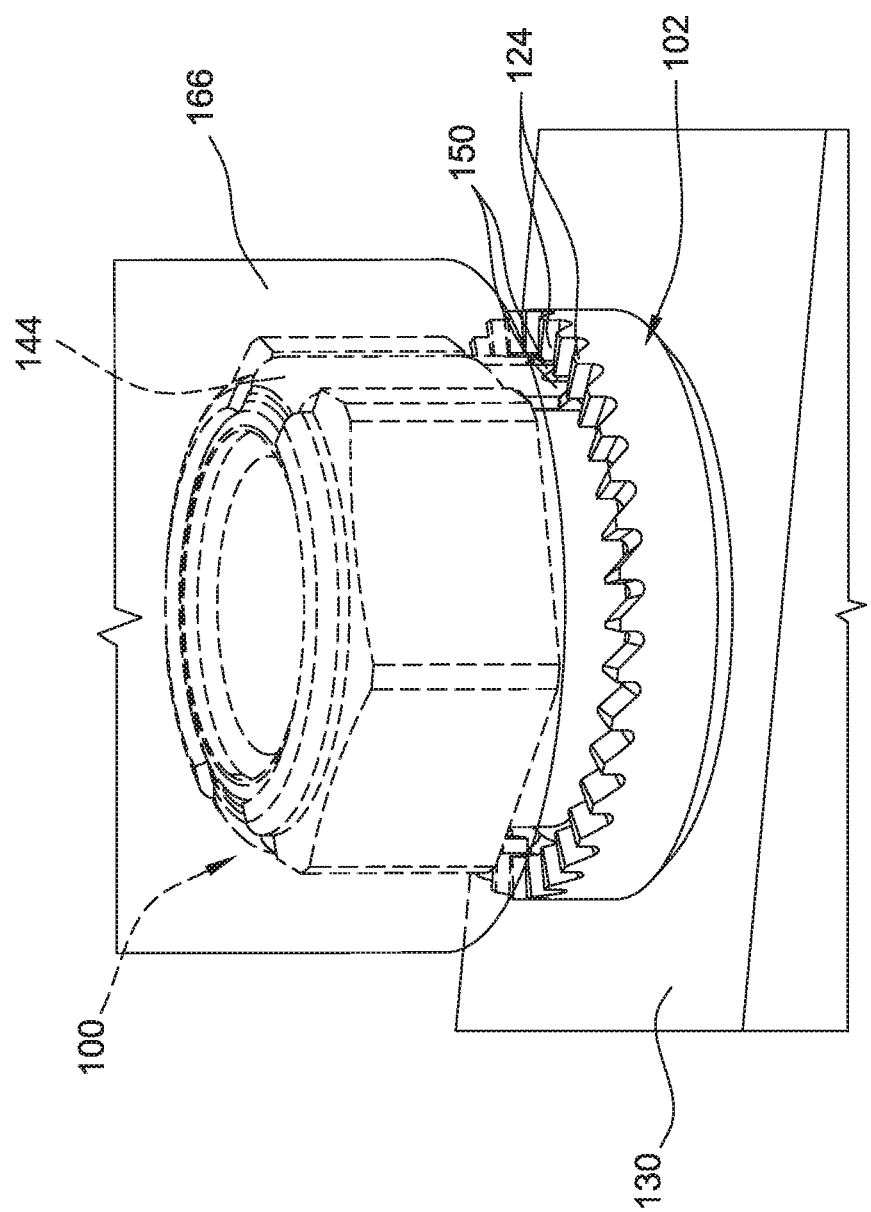
FIG. 13 is an enlarged perspective view of the tool engaging the second lock member and positioning the second lock member in the unlock position.

FIG. 12 is a sectional view of fastener assembly 100 coupling components 130, 162 together and a tool 166 for positioning second lock member 104 in an unlock position. FIG. 13 is an enlarged perspective view of tool 166 engaging second lock member 104 and positioning second lock member 104 in the unlock position. Tool 166 includes a body 168 having a stepped bore 170 extending axially therethrough. Stepped bore 170 includes a cylindrical portion 172 and an engagement portion 174. Stepped bore 170 has a diameter or width configured to receive fastener assembly 100 therein such that body 168 engages outer portions of second lock member 104, as is described herein. Stepped bore 170 extends axially through body 170 a predetermined distance configured to facilitate receiving the entirety of fastener assembly 100 in stepped bore 170. Engagement portion 174 of stepped bore 170 includes wrenching surfaces 176 extending from cylindrical portion 172 to a first end 178 of body 168. Wrenching surfaces 176 correspond in shape and size to head portion 110 and are configured to engage head portion 110 of fastener assembly 100. At a second end 180 of body 168, stepped bore 170 includes a driver connection 182 for receiving driving torque from a driving member (not shown), such as a ratchet. In alternative embodiments, fastener assembly 100 is used with any tool 166 that enables fastener assembly 100 to operate as described herein. For example, in some embodiments, tool 166 includes bore 170 without a cylindrical portion 172.

In addition, in the exemplary embodiment, tool 166 is arranged to engage second lock member 104 coupled to threaded member 106 when fastener assembly 100 is received in stepped bore 170. For example, spring fingers 144 of second lock member 104 extend over and along sides of head portion 110 at least partially through slots 114 when annular body 142 is positioned in cavity 156. The maximum width of second lock member 104 is greater than a width of head portion 110 such that free ends 148 of spring fingers 144 extend beyond the outer surface of head portion 110 when second lock member 104 is in the unlock position. Accordingly, tool 166 contacts free ends 148 when tool 166 is fitted over head portion 110. Slots 114 are sized and shaped to allow displacement of spring fingers 144 radially inward of teeth 150 on first lock member 102 when body 168 of tool 166 contacts spring fingers 144 of second lock member 104. Accordingly, tool 166 contacts outer surfaces of spring fingers 144 and displaces spring fingers 144 radially inward such that teeth 150 disengage from teeth 124. In such a manner, tool 166 is used to position second lock member 104 in the unlock position which allows rotation of second lock member 104 and threaded member 106 relative to first lock member 102 and panel 130.

Figure 14:
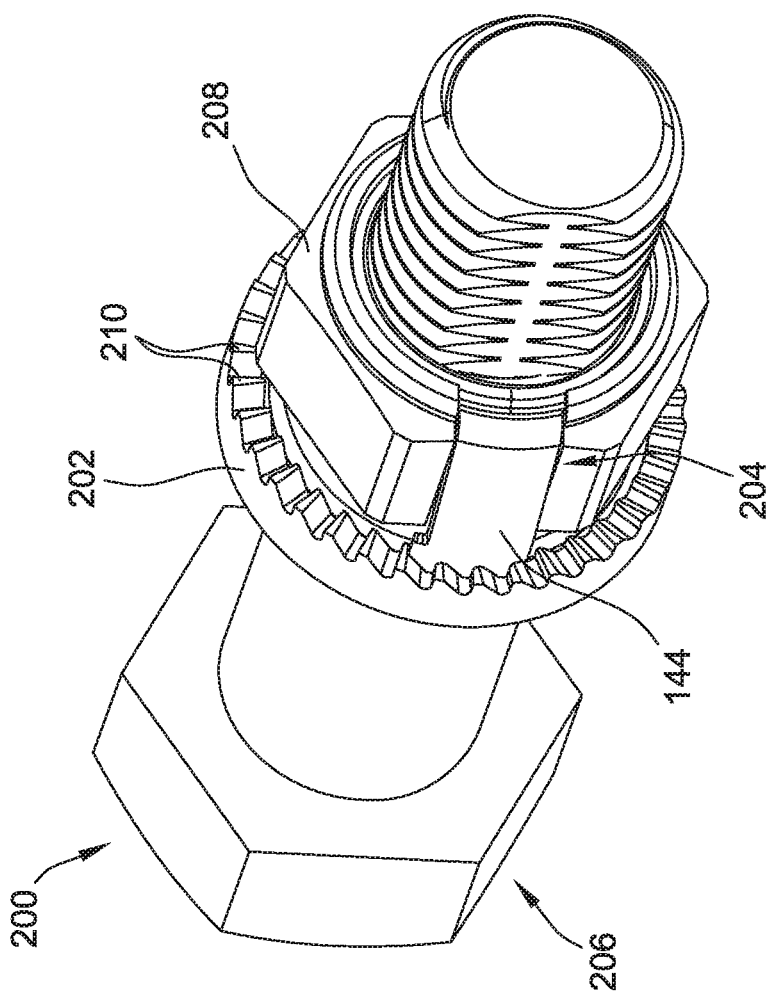
FIG. 14 is a perspective view of an alternative exemplary embodiment of a fastener assembly.
Figure 15:
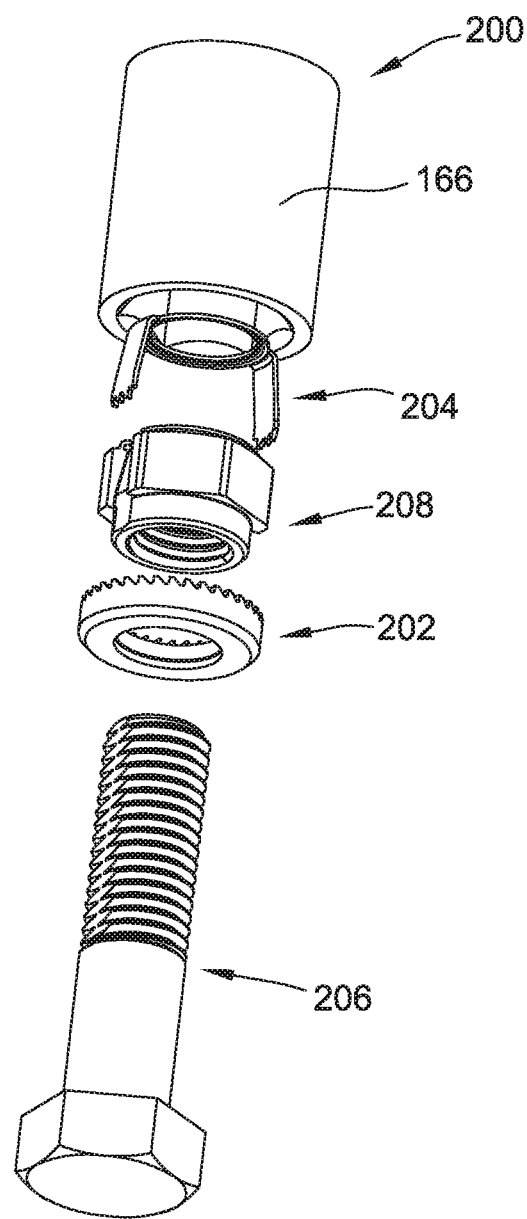
FIG. 15 is an exploded perspective view of the fastener assembly shown in FIG. 14, including a tool for use with the fastener assembly.

FIG. 14 is a perspective view of an alternative exemplary embodiment of a fastener assembly 200. FIG. 15 is an exploded perspective view of fastener assembly 200. Fastener assembly 200 includes a first lock member 202, a second lock member 204, a threaded member 206, and a nut 208. Fastener assembly 200 is similar to fastener assembly 100 (shown in FIG. 1) except fastener assembly 200 includes nut 208 that releasably couples to second lock member 204.

In the exemplary embodiment, threaded member 206, first lock member 202, second lock member 204, and nut 208 are fabricated from a metal, for example and without limitation, steel, aluminum, titanium, or a superalloy. Alternatively, threaded member 206, first lock member 202, second lock member 204, and nut 208 are fabricated from any material that enables fastener assembly 200 to function as described herein, such as, without limitation, composite materials, resins, fiber reinforced resins, plastics, and fiber reinforced plastics.

Figure 16:
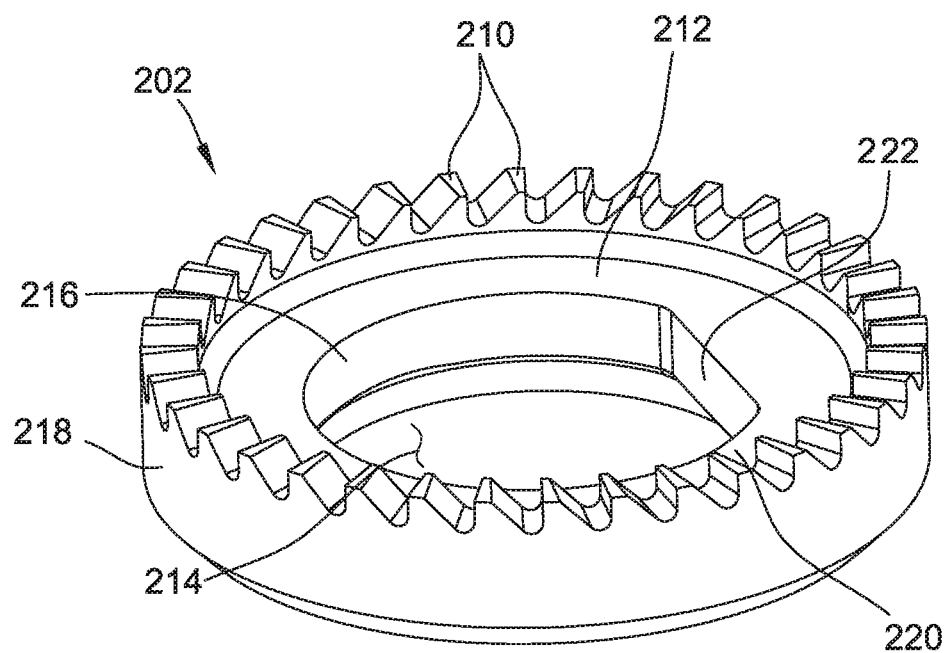
FIG. 16 is a perspective view of a first lock member of the fastener assembly shown in FIGS. 14 and 15.

FIG. 16 is a perspective view of first lock member 202 of fastener assembly 200 (shown in FIGS. 14 and 15). In the exemplary embodiment, first lock member 202 includes a plurality of axially-extending ratchet teeth 210 and a body 212 defining an aperture 214 extending therethrough. Body 212 has an inner circumferential surface 216, an outer circumferential surface 218, and an annular surface 220 extending between inner circumferential surface 216 and outer circumferential surface 218. Axially-extending ratchet teeth 210 extend upward from annular surface 220. Aperture 214 is sized to receive threaded member 206. In alternative embodiments, fastener assembly 200 includes any first lock member 202 that enables fastener assembly 200 to function as described herein.

In addition, in the exemplary embodiment, first lock member 202 includes at least one anti-rotation feature configured to rotationally fix first lock member 202 with respect to threaded member 206 (shown in FIGS. 14 and 15). Anti-rotation features of first lock member 202 and threaded member 206 prevent rotation of first lock member 202 relative to threaded member 206. Anti-rotation features include, for example and without limitation, flats, notches, grooves, slots, or any other feature that enables fastener assembly 200 to function as described herein. In the exemplary embodiment, the anti-rotation features on first lock member 202 include a flat or planar engagement area 222 formed in inner circumferential surface 216. In alternative embodiments, fastener assembly 200 includes any anti-rotation feature that enables threaded member 206 to operate as described herein.

Figure 17:
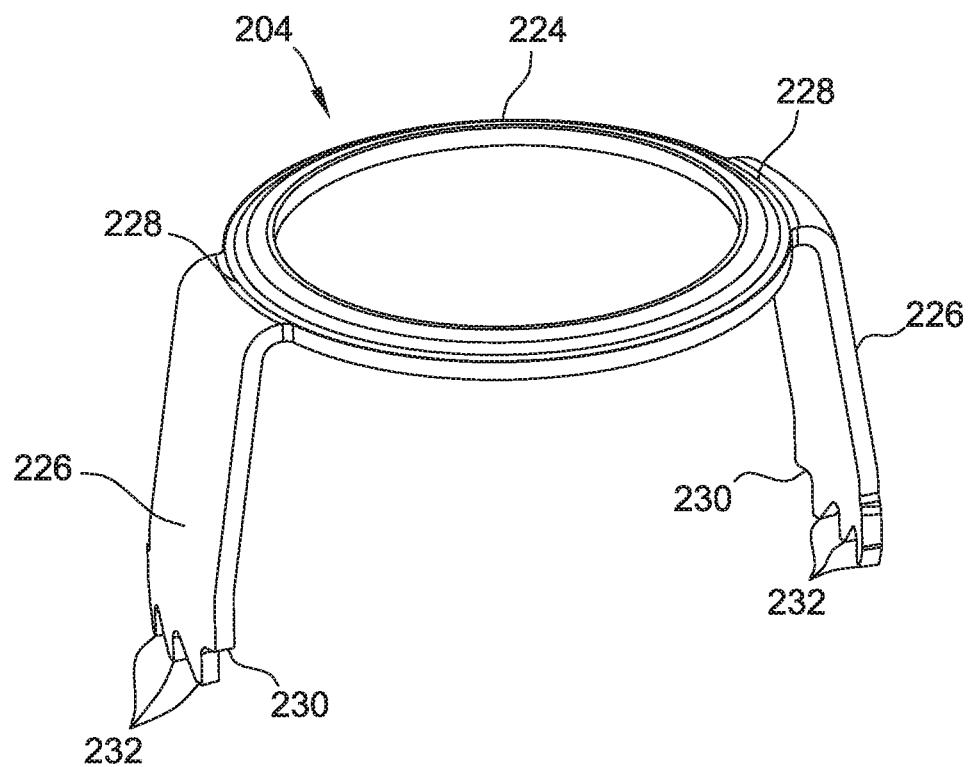
FIG. 17 is a perspective view of a second lock member of the fastener assembly shown in FIGS. 14 and 15, the second lock member configured to engage the first lock member when the second lock member is in a lock position.

FIG. 17 is a perspective view of second lock member 204 of fastener assembly 200 (shown in FIGS. 14 and 15). Second lock member 204 is configured to couple to nut 208 (shown in FIGS. 14 and 15) for rotation therewith. In addition, second lock member 204 is configured to engage first lock member 202 (shown in FIG. 16) when second lock member 204 is in a lock position. Second lock member 204 includes a base portion 224 and at least one spring finger 226 extending axially from base portion 224. In the exemplary embodiment, base portion 224 of second lock member 204 comprises an annular ring. In alternative embodiments, second lock member 204 includes any base portion 224 that enables fastener assembly 200 to function as described herein.

Also, in the exemplary embodiment, second lock member 204 includes diametrically opposed spring fingers 226 extending axially from opposite sides of base portion 224. Each spring finger 226 has a proximal end 228 joined to base portion 224 and a free end 230 opposite proximal end 228. Each free end 230 includes a plurality of axially-extending teeth 232. Second lock member 204 has a lock position in which teeth 232 on free end 230 of each spring finger 226 are configured to engage axially-extending ratchet teeth 210 on first lock member 202 (shown in FIG. 16) and an unlock position in which free ends 230 are spaced from ratchet teeth 210. In the exemplary embodiment, second lock member 204 is a single piece. In alternative embodiments, fastener assembly 200 includes any second lock member 204 that enables fastener assembly 200 to function as described herein. For example, in some embodiments, spring fingers 226 are one or more separate pieces coupled to base portion 224.

Figure 18:
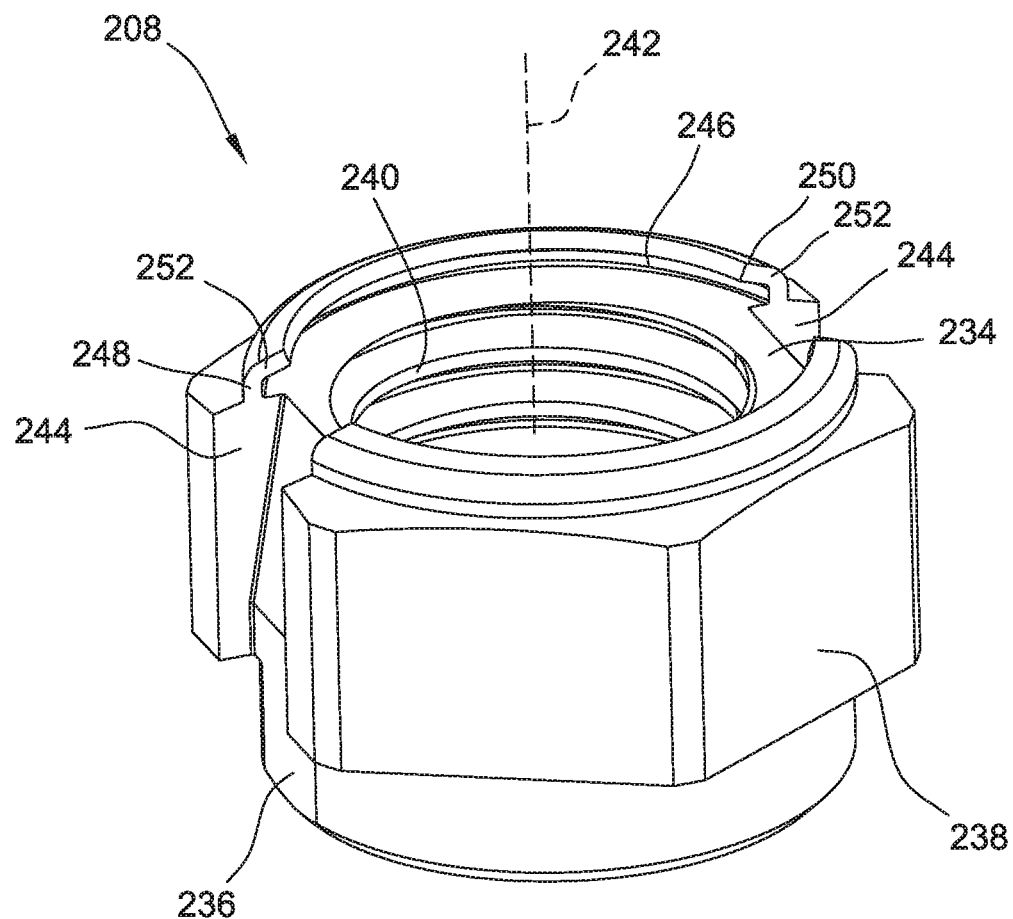
FIG. 18 is a perspective view of a nut of the fastener assembly shown in FIGS. 14 and 15, the nut configured to releasably couple to the second lock member shown in FIG. 17.

FIG. 18 is a perspective view of nut 208 of fastener assembly 200 (shown in FIGS. 14 and 15). In the exemplary embodiment, nut 208 is a hexagonal nut and is rotatable using a tool such as a wrench. In alternative embodiments, fastener assembly 200 includes any nut 208 that enables fastener assembly 200 to operate as described herein.

In the exemplary embodiment, nut 208 is configured to releasably couple to second lock member 204 (shown in FIG. 17). Nut 208 includes an upper surface 234, a lower surface 236 opposite upper surface 234, and a circumferential surface 238 extending between upper surface 234 and lower surface 236. A threaded bore 240 is defined in nut 208 and extends along a central axis 242 of nut 208 from lower surface 236 to upper surface 234. Threaded bore 240 is configured to engage threaded member 206 such that nut 208 is able to be threaded on threaded member 206.

Also, in the exemplary embodiment, circumferential surface 238 has at least one axially-extending slot 244 defined therein. In the exemplary embodiment, a pair of diametrically opposite slots 244 are defined by circumferential surface 238 and are arranged to receive spring fingers 226 (shown in FIG. 16). In addition, slots 244 are configured to at least partially engage spring fingers 226 to fix rotation of second lock member 204 relative to nut 208 when second lock member 204 is coupled to nut 208.

In addition, in the exemplary embodiment, nut 208 defines a cavity 246 sized to receive base portion 224 of second lock member 204 (shown in FIG. 16). Nut includes a lip 248 that extends axially outward from upper surface 234 and at least partially around cavity 246. A collar 250 extends radially inward from lip 248 to retain base portion 224 of second lock member 204 in cavity 246. Lip 248 includes notches 252 aligned with slots 244 and sized to receive spring fingers 226 (shown in FIG. 16). Notches 252 allow spring fingers 226 to extend into slots 244. Accordingly, second lock member 204 (shown in FIG. 16) is configured to couple to nut 208 such that base portion 224 is positioned in cavity 246 and spring fingers 226 extend at least partially through slots 244. In alternative embodiments, second lock member 204 couples to nut 208 in any manner that enables fastener assembly 200 to function as described herein.

Figure 19:
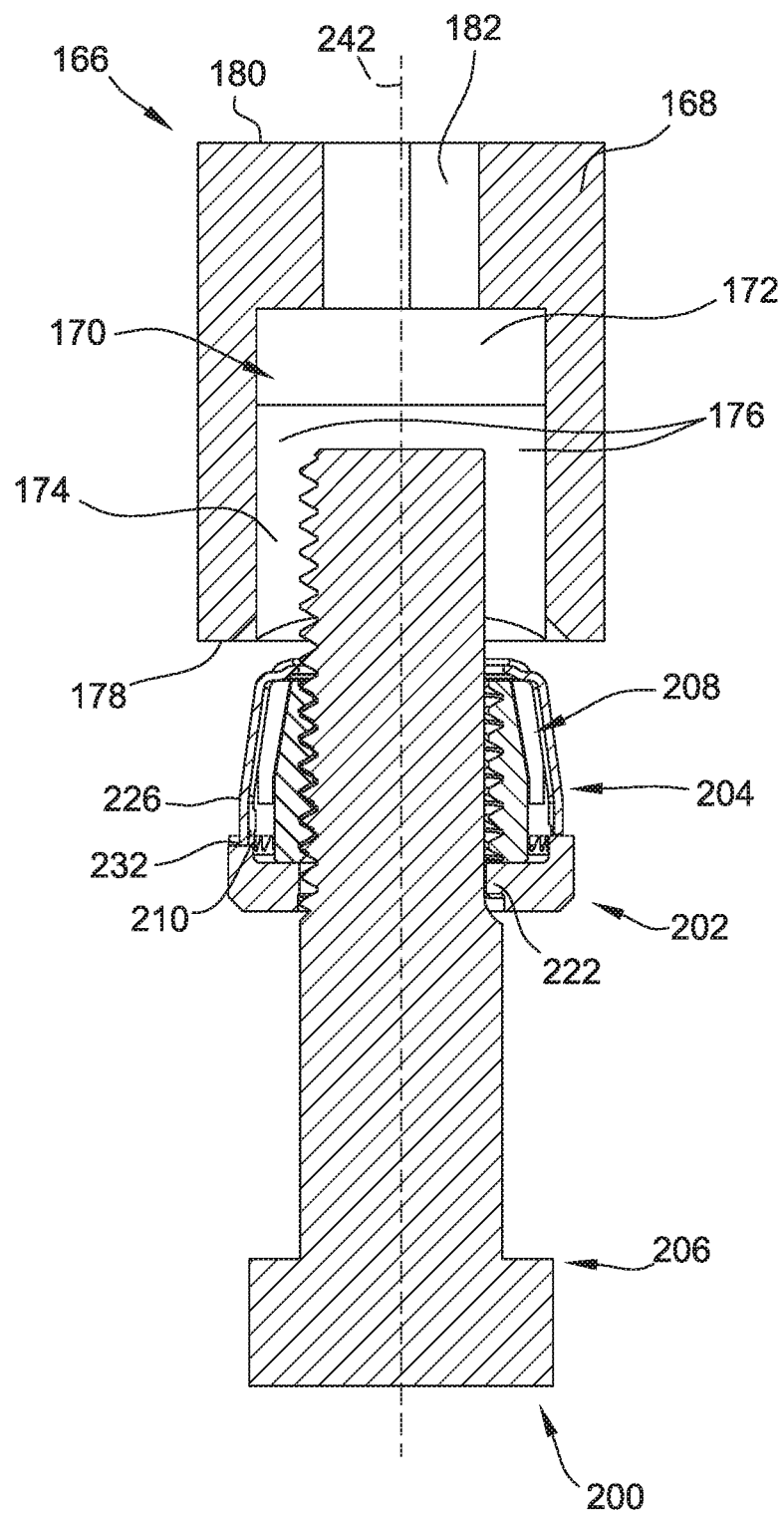
FIG. 19 is a sectional view of the fastener assembly and the tool shown in FIG. 15 with the second lock member in the lock position.

FIG. 19 is a sectional view of tool 166 and fastener assembly 200 with second lock member 204 in the lock position. In the lock position, second lock member 204 is coupled to nut 208 and second lock member 204 engages first lock member 202 to prevent rotation of second lock member 104 and threaded member 106 relative to first member 102. Specifically, teeth 232 on spring fingers 226 engage teeth 210 of first lock member 202. The ratcheting engagement of teeth 232 and teeth 210 allow rotation of nut 208 to tighten nut 208 on threaded member 206 and prevent rotation of nut 208 in the opposite direction when teeth 210 are positioned to engage teeth 232.

Figure 20:
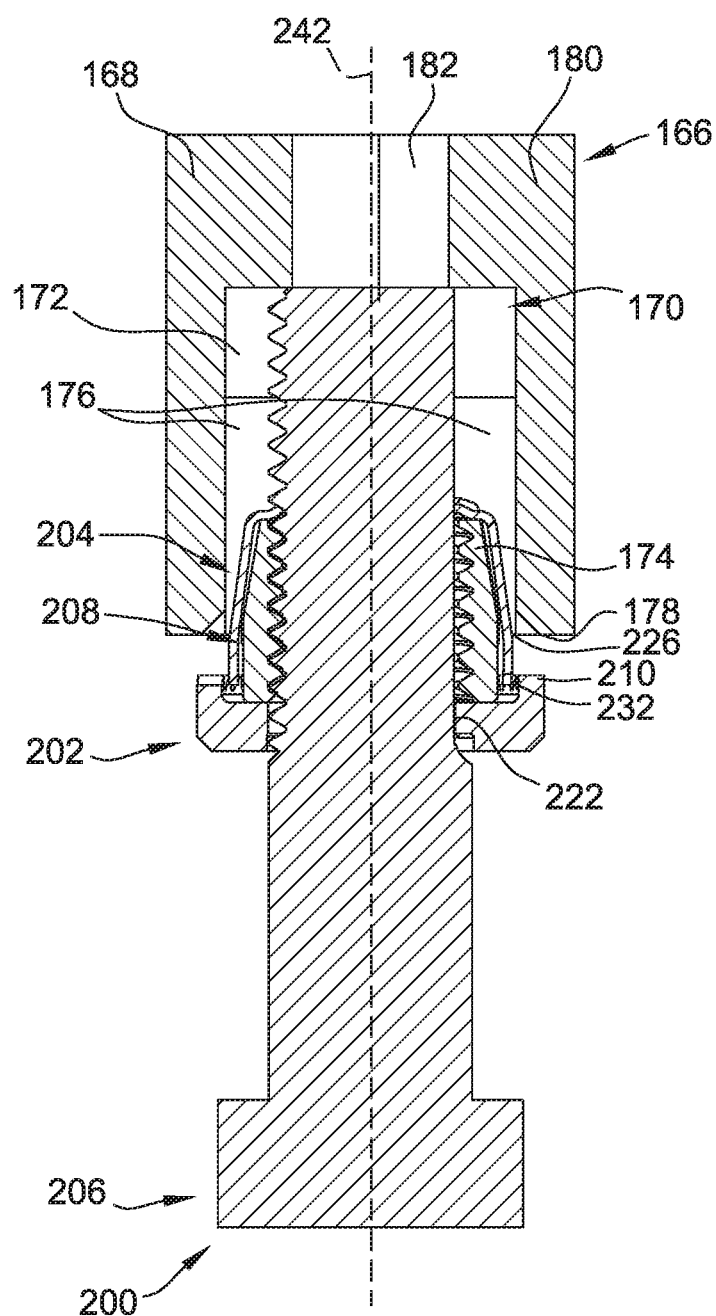
FIG. 20 is a sectional view of the fastener assembly and the tool shown in FIGS. 15 and 19 with the second lock member in an unlock position.
Figure 21:
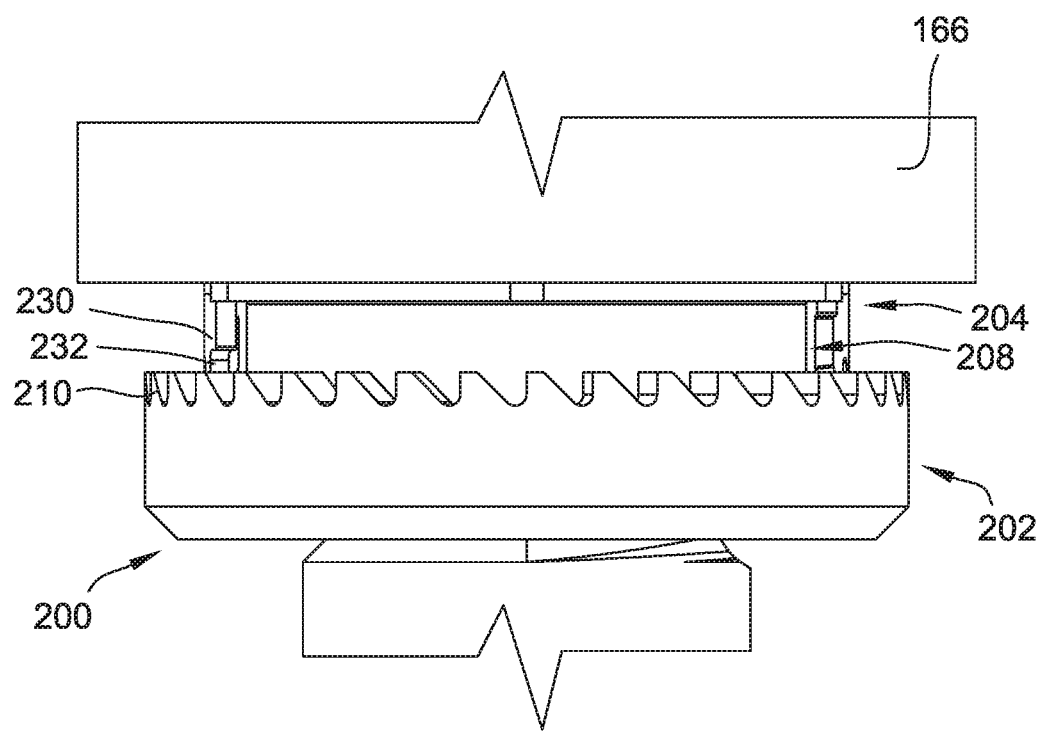
FIG. 21 is an enlarged perspective view of the tool engaging the second lock member to position the second lock member in the unlock position.

FIG. 20 is a sectional view of tool 166 and fastener assembly 200 with second lock member 204 in an unlock position. FIG. 21 is an enlarged perspective view of tool 166 engaging second lock member 204 and positioning second lock member 204 in the unlock position. Tool 166 is configured to switch fastener assembly 200 between the lock position and the unlock position. Tool 166 is usable with both fastener assembly 100 (shown in FIGS. 11 and 12) and fastener assembly 200 because tool 166, fastener assembly 100, and fastener assembly 200 include structures having similar sizes and shapes. Accordingly, fastener assembly 100 and fastener assembly 200 do not required tools having custom dimensions or features for unlocking. In alternative embodiments, fastener assembly 200 is unlocked using any tool 166 that enables fastener assembly to operate as described herein.

In addition, in the exemplary embodiment, stepped bore 170 of tool 166 is sized to receive fastener assembly 200 such that body 168 of tool 166 extends around and engages second lock member 204 coupled to threaded member 206. For example, spring fingers 226 of second lock member 204 extend over and along sides of nut 208 and at least partially through slots 244 when base portion 224 is positioned in cavity 246. The maximum width of second lock member 204 is greater than a width of nut 208 such that free ends 230 of spring fingers 226 extend beyond the outer surface of nut 208. Accordingly, tool 166 contacts free ends 230 when tool 166 is fitted over nut 208. Slots 244 are sized and shaped to allow displacement of spring fingers 226 radially inward of teeth 210 on first lock member 202 when body 168 of tool 166 contacts spring fingers 226 of second lock member 204. For example, tool 166 contacts outer surfaces of spring fingers 226 and displaces spring fingers 226 radially inward such that teeth 232 disengage from teeth 210 when tool 166 is positioned over fastener assembly 200. Accordingly, tool 166 is arranged to position second lock member 204 in the unlock position which allows rotation of second lock member 204 and nut 208 relative to threaded member 106.

Figure 22:
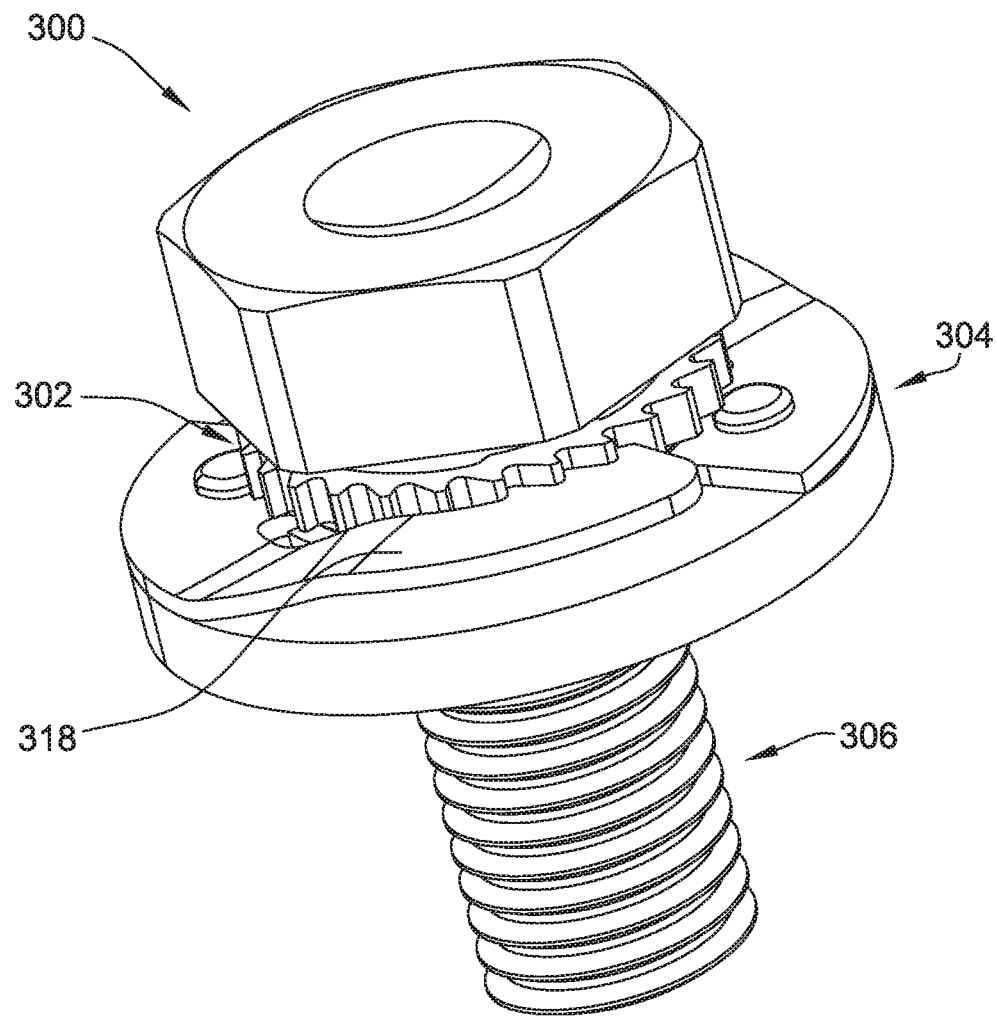
FIG. 22 is a perspective view of another alternative exemplary embodiment of a fastener assembly.
Figure 23:
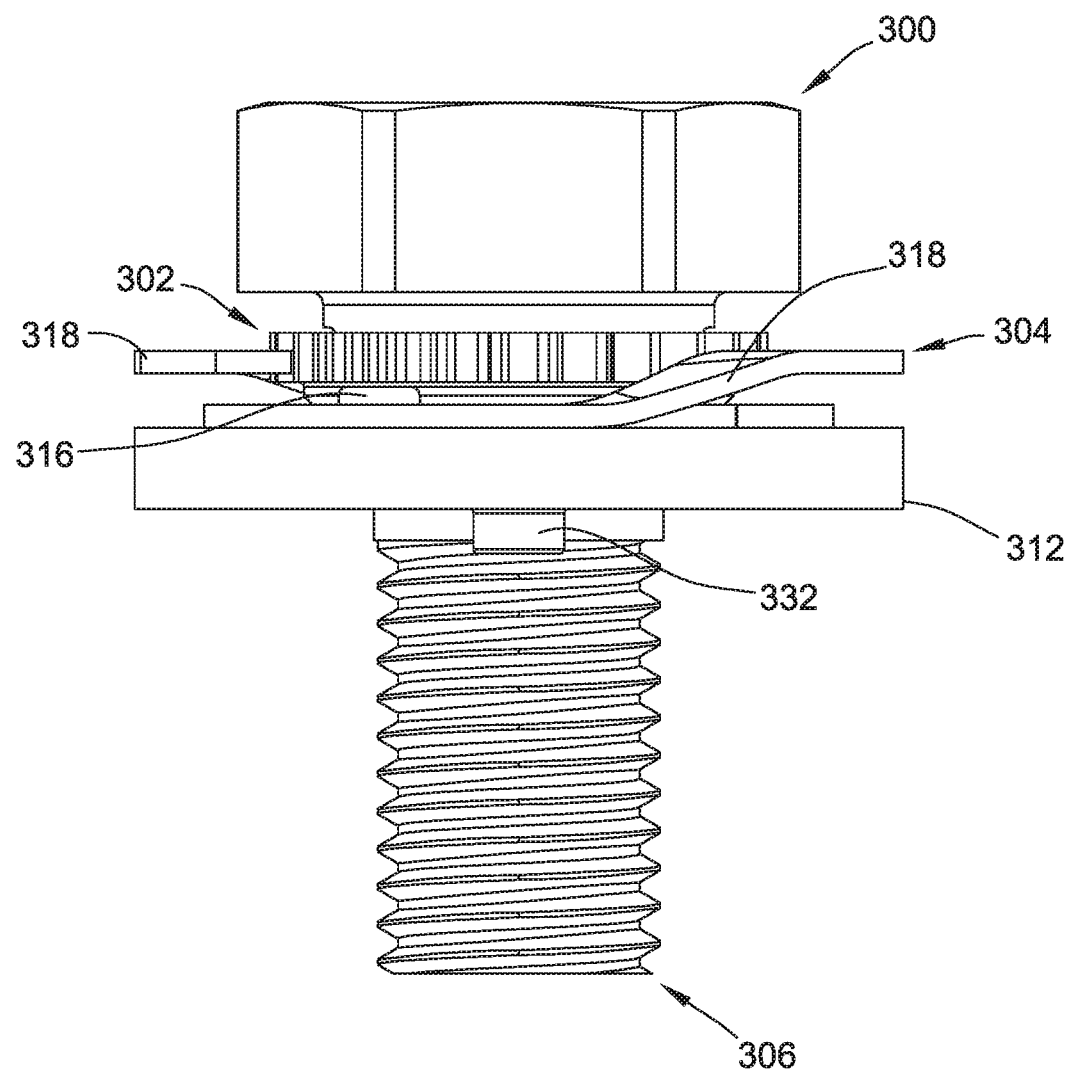
FIG. 23 is a side view of the fastener assembly shown in FIG. 22.

FIG. 22 is a perspective view of an exemplary embodiment of a fastener assembly 300. FIG. 23 is a side view of fastener assembly 300. Fastener assembly 300 includes a first lock member 302, a second lock member 304, and a threaded member 306. Fastener assembly 300 is similar to fastener assembly 100 (shown in FIG. 1) except second lock member 304 of fastener assembly 200 is in the form of a lock washer.

In the exemplary embodiment, threaded member 306, first lock member 302, and second lock member 304 are fabricated from a metal, for example and without limitation, steel, aluminum, titanium, or a superalloy. Alternatively, threaded member 306, first lock member 302, and second lock member 304 are fabricated from any material that enables fastener assembly 300 to function as described herein, such as, without limitation, composite materials, resins, fiber reinforced resins, plastics, and fiber reinforced plastics.

Figure 24:
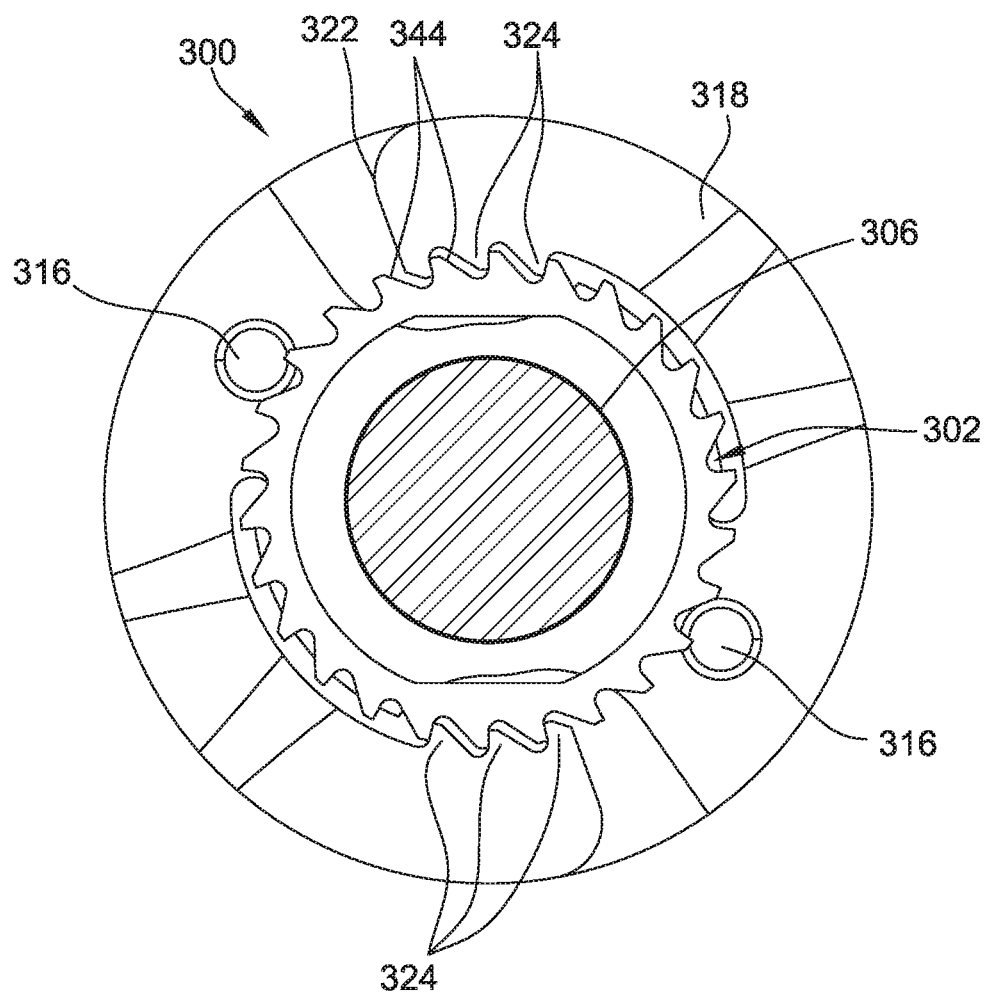
FIG. 24 is a top view of a portion of the fastener assembly shown in FIG. 23 with a head portion removed to allow illustration of a first lock member of the fastener assembly engaging a second lock member of the fastener assembly.

FIG. 24 is a top view of a portion of fastener assembly 300 with a head portion of threaded member 306 removed to allow illustration of first lock member 302 engaging second lock member 304. First lock member 302 is configured to engage threaded member 306 for rotation therewith. Second lock member 304 is configured to engage first lock member 302 to prevent rotation of first lock member 302 and threaded member 306 when second lock member 304 is in the lock position. In addition, second lock member 304 is positionable in an unlock position to allow rotation of first lock member 302 and threaded member 306 relative to second lock member 304.

Figure 25:
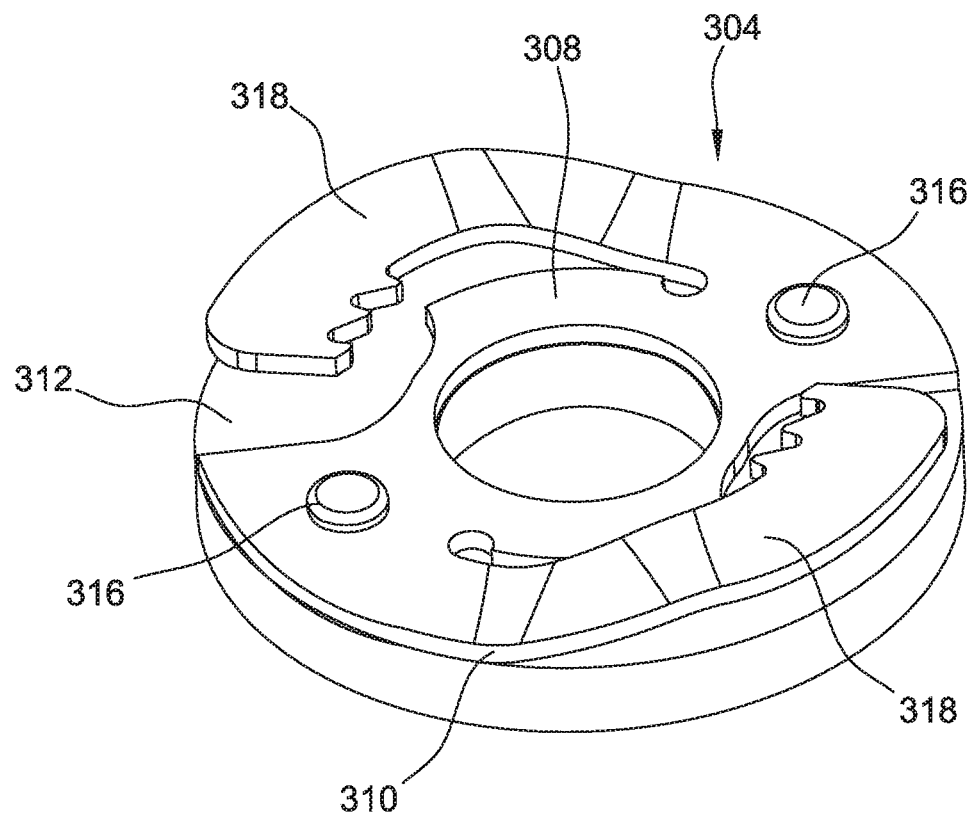
FIG. 25 is a perspective view of the second lock member of the fastener assembly shown in FIGS. 22-24.

FIG. 25 is a perspective view of second lock member 304 of fastener assembly 300 (shown in FIGS. 22-24). Second lock member 304 includes an inner portion 308, an outer portion 310, and a base portion 312. In the exemplary embodiment, inner portion 308 and outer portion 310 are formed as a single piece. Base portion 312 is configured to couple to inner portion 308 and outer portion 310. Specifically, second lock member 304 includes a plurality of engagement features, e.g., pins 316, that retain inner portion 308, outer portion 310, and base portion 312 together for conjoint rotation. In alternative embodiments, base portion 312 is coupled to outer portion 310 or inner portion 308 in any manner that enables second lock member 304 to function as described herein. For example, in some embodiments, base portion 312 is permanently attached to inner portion 308. In further embodiments, inner portion 308, outer portion 310, and base portion 312 are integrally formed and second lock member 304 is a single piece.

Figure 26:
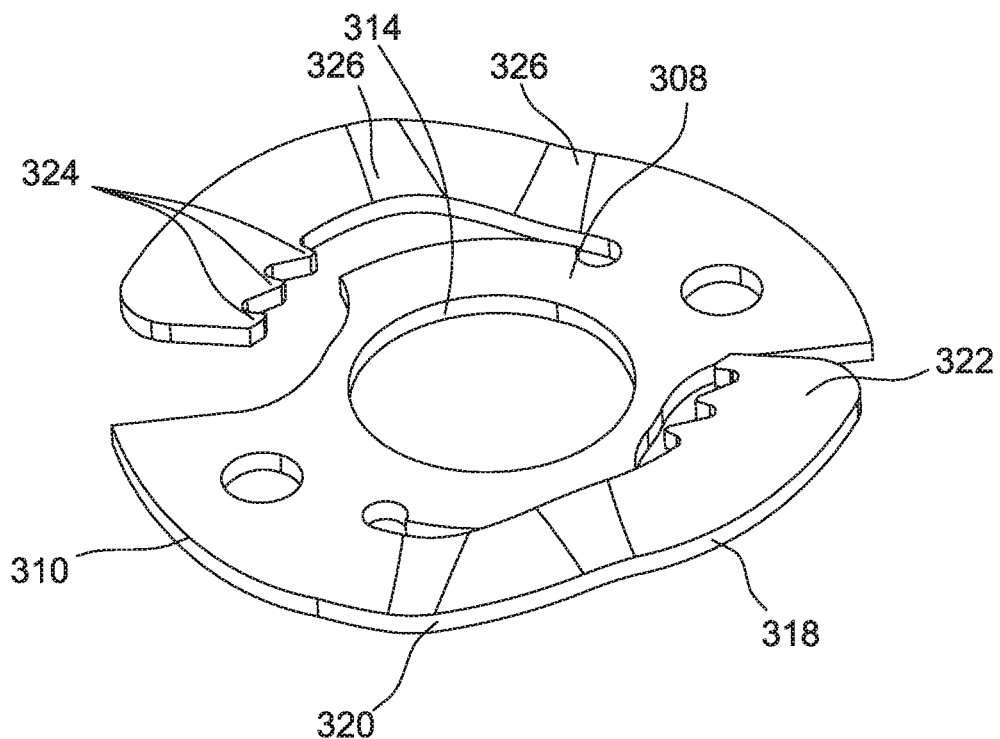
FIG. 26 is a perspective view of a portion of the second lock member shown in FIG. 25, the second lock member including a plurality of teeth.

FIG. 26 is a perspective view of a portion of second lock member 304. Inner portion 308 defines an aperture 314 extending therethrough. Aperture 314 is sized to receive threaded member 306. Outer portion 310 includes at least one tab 318 extending circumferentially about and axially from inner portion 308. In the exemplary embodiment, outer portion 310 includes a pair of diametrically opposite tabs 318. Each tab 318 has a proximal end 320 joined to inner portion 308 and a free end 322 opposite proximal end 320. Each free end 322 includes a plurality of radially-extending teeth 324. In addition, each tab 318 includes bends 326 between proximal end 320 and free end 322. Bends 326 are configured such that radially-extending teeth 324 on free ends 322 of tabs extend radially inward toward first lock member 302. For example, each bend 326 defines an angle of 45° or greater. In alternative embodiments, second lock member 304 includes any tab 318 that enables second lock member 304 to function as described herein.

Figure 27:
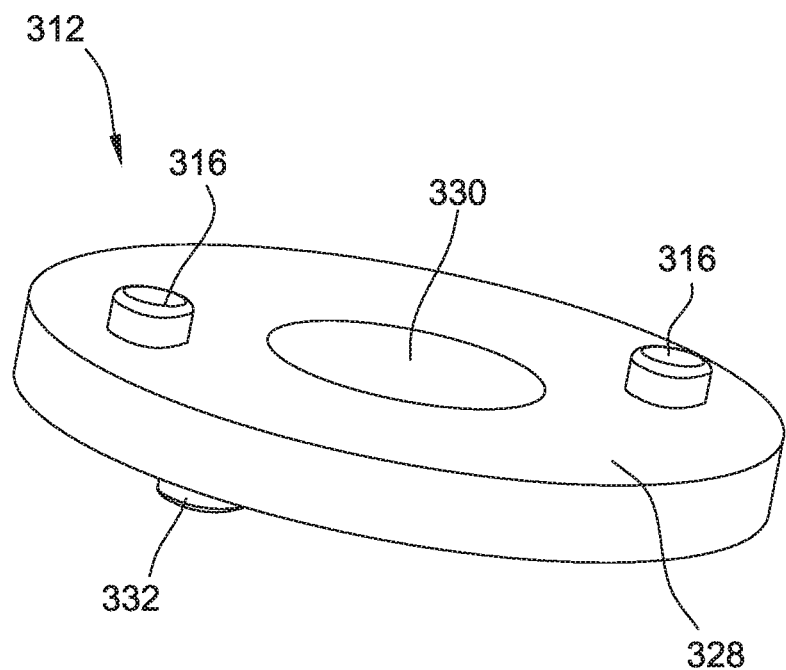
FIG. 27 is a perspective view of a lower portion of the second lock member shown in FIG. 25.

FIG. 27 is a perspective view of base portion 312 of second lock member 304. Base portion 312 includes an annular body 328 defining an aperture 330 sized to receive threaded member 306 (shown in FIG. 22). Aperture 330 is aligned with aperture 314 (shown in FIG. 26) when base portion 312 is coupled to inner portion 308. Base portion 312 includes a plurality of pins 316 that are received in openings in inner portion 308 to couple base portion 312 to inner portion 308 and outer portion 310. In addition, base portion 312 includes at least one anti-rotation structure configured to engage components, such as components 354 (shown in FIG. 30), and restrict movement of second lock member 304 relative to the components. In the exemplary embodiment, anti-rotation structures include pins 332 that extend axially from a lower surface of base portion 312.

Figure 28:
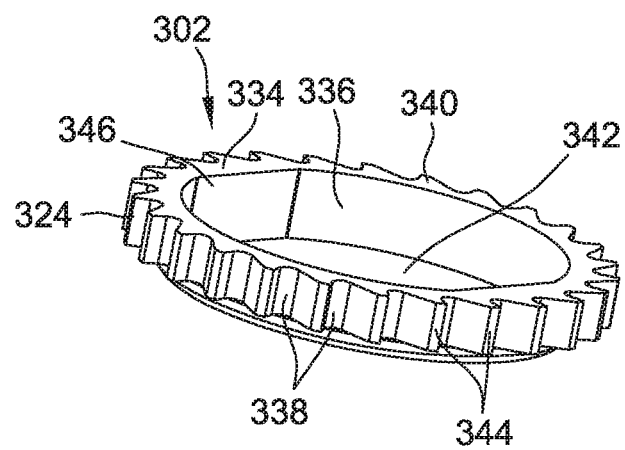
FIG. 28 is a perspective view of the first lock member of the fastener assembly shown in FIGS. 22-24.

FIG. 28 is a perspective view of first lock member 302 of fastener assembly 300. First lock member 302 includes a body 334 having an inner circumferential surface 336, an outer circumferential surface 338, and opposed annular surfaces 340 extending between inner circumferential surface 336 and outer circumferential surface 338. Inner circumferential surface 336 defines an aperture 342 extending through body 334 and sized to receive threaded member 306 (shown in FIG. 22). In addition, first lock member 302 includes a plurality of radially-extending ratchet teeth 344 extending radially outward from outer circumferential surface 338. Ratchet teeth 344 are configured to engage radially-extending teeth 324 when second lock member 304 is in the lock position.

In addition, in the exemplary embodiment, first lock member 302 includes at least one anti-rotation feature configured to rotationally fix first lock member 302 with respect to threaded member 306 (shown in FIG. 22). Anti-rotation features include, for example and without limitation, flats, notches, grooves, slots, or any other feature that enables fastener assembly 300 to function as described herein. In the exemplary embodiment, anti-rotation features include a flat or planar engagement area 346 formed in inner circumferential surface 336. In alternative embodiments, fastener assembly 300 includes any anti-rotation features that enable fastener assembly 300 to operate as described herein.

Figure 29:
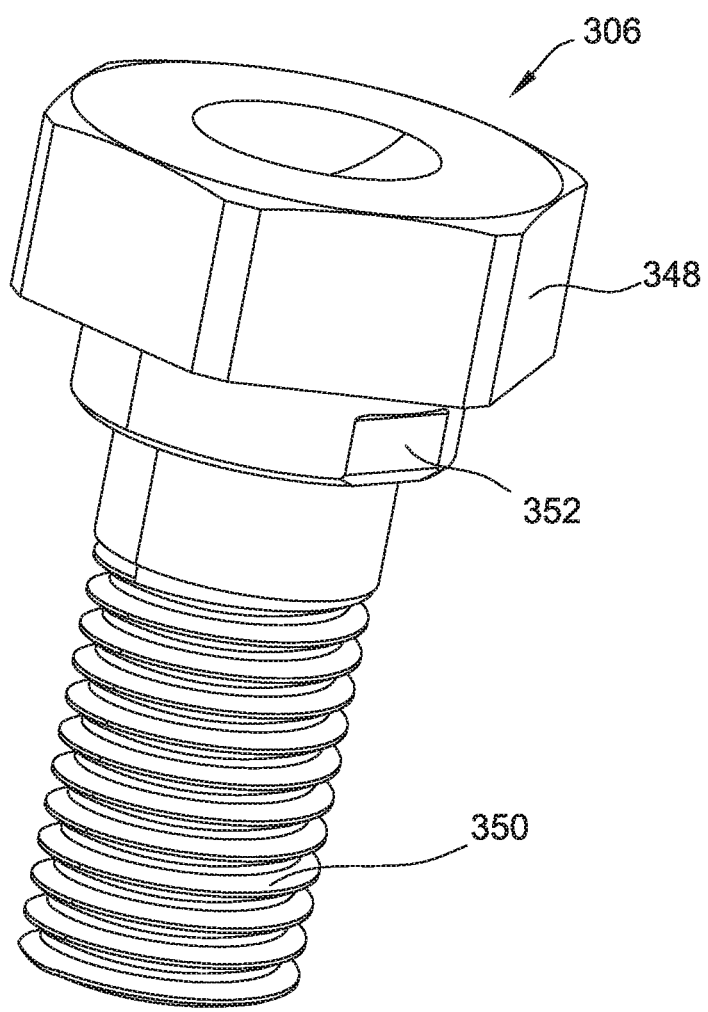
FIG. 29 is a perspective view of a threaded member of the fastener assembly shown in FIGS. 22-24.

FIG. 29 is a perspective view of threaded member 306 of fastener assembly 300. Threaded member 306 includes a head portion 348 and an elongated threaded body portion 350 extending axially from head portion 348. Alternatively, threaded member 306 may be free of head portion 348. For example and without limitation, threaded member 306 may be a threaded rod, a bolt, a screw, or any other threaded component that enables fastener assembly 100 to function as described herein.

In the exemplary embodiment, head portion 348 is a hexagonal head. Alternatively, head portion 348 is any form, for example and without limitation, a spline head, a socket cap, a tulip head, and a pan head, that enables fastener assembly 300 to function as described herein.

In the exemplary embodiment, threaded member 306 includes at least one anti-rotation feature to prevent rotation of first lock member 302 relative to threaded member 306 when first lock member 302 is positioned on threaded body portion 350. Anti-rotation features include, for example and without limitation, flats, notches, grooves, slots, or any other feature that enables threaded member 306 to function as described herein. In the exemplary embodiment, anti-rotation features include a flat or planar engagement area 352 formed on threaded body portion 350. In alternative embodiments, threaded member 306 includes any anti-rotation features that enable threaded member 306 to operate as described herein.

Figure 30:
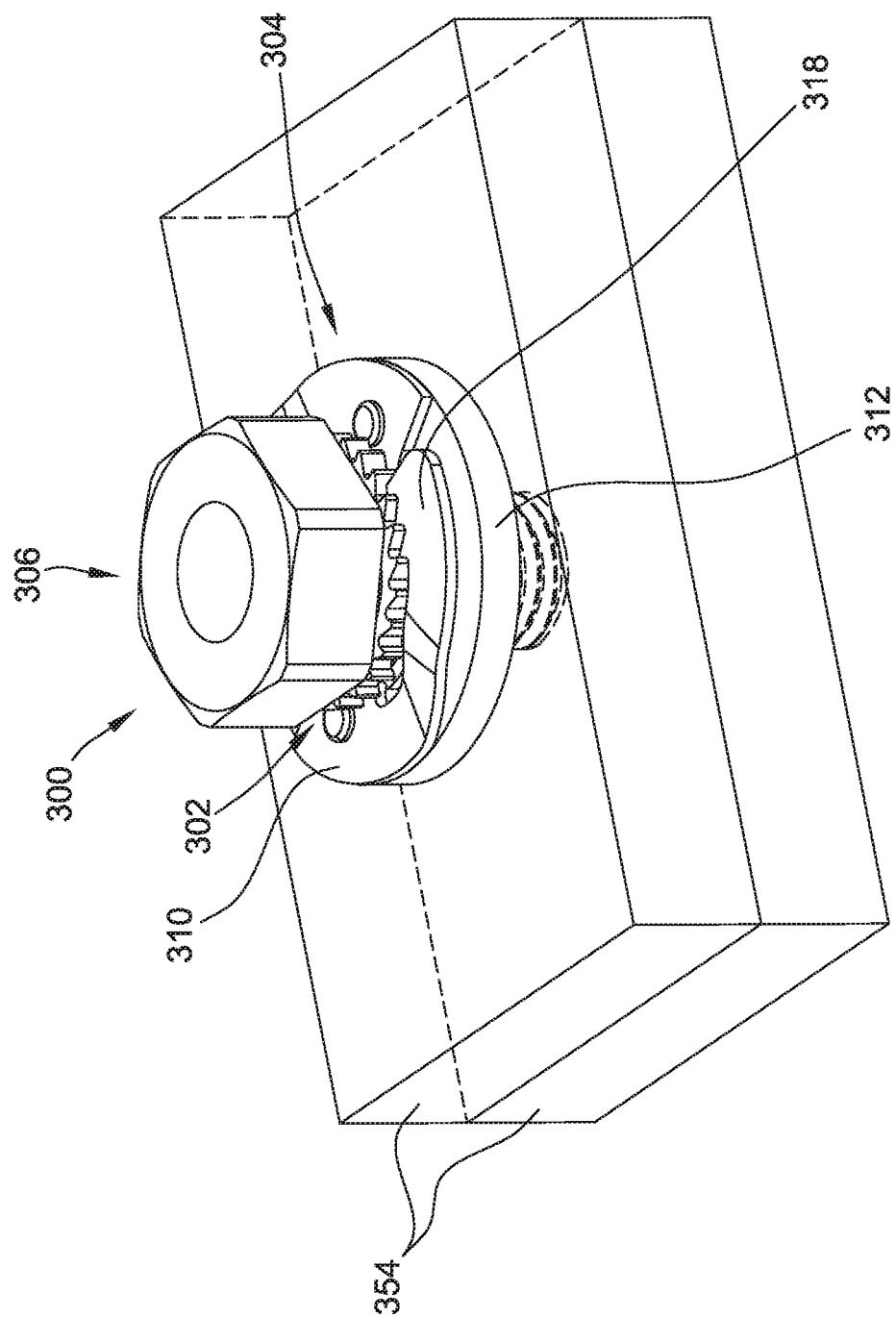
FIG. 30 is a perspective view of components coupled together using the fastener assembly shown in FIGS. 22-24.
Figure 31:
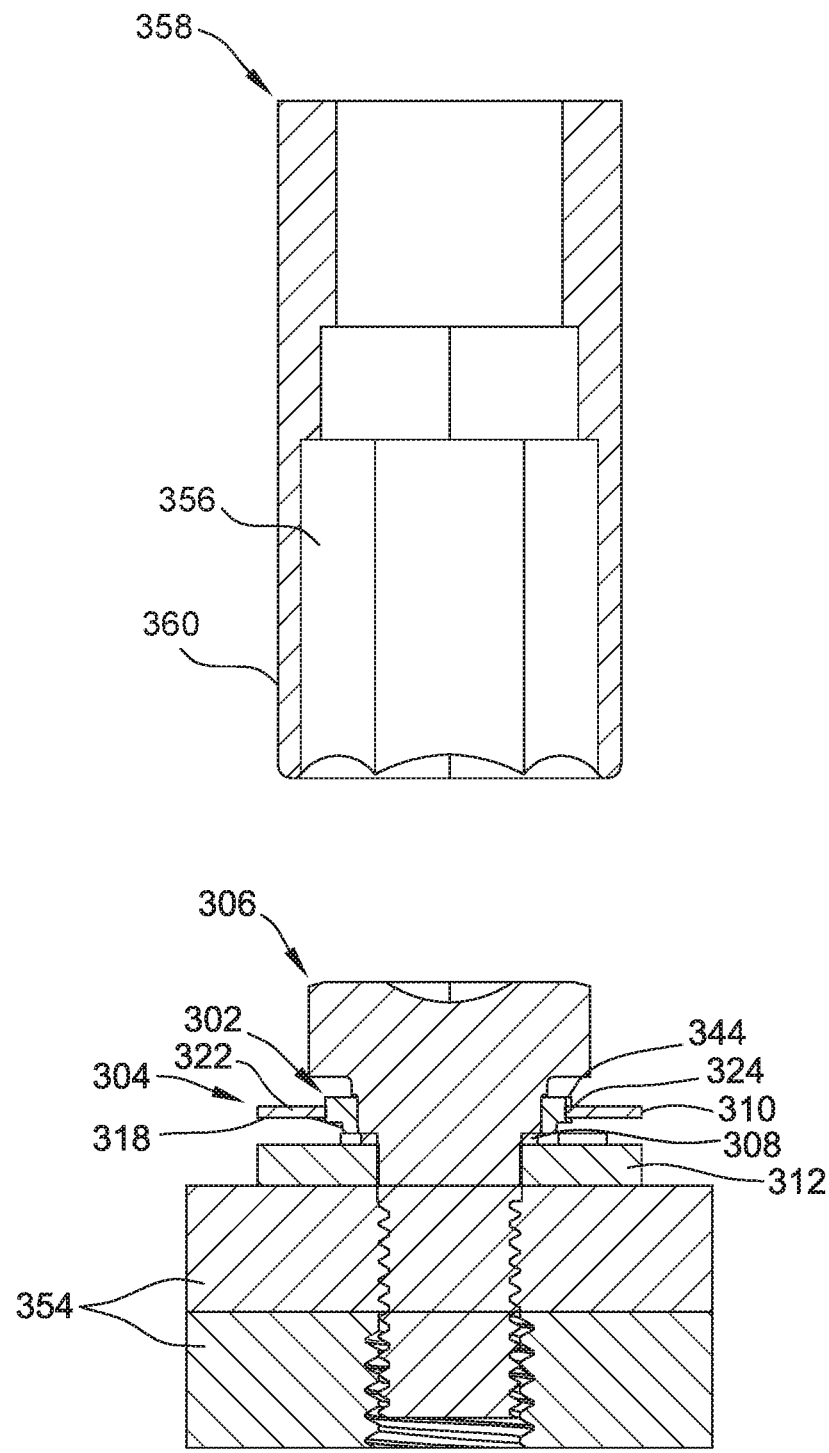
FIG. 31 is a sectional view of the components shown in FIG. 30 coupled together using the fastener assembly shown in FIGS. 22-24, the second lock member of the fastener assembly in a lock position.

FIG. 30 is a perspective view of components 354 coupled together using fastener assembly 300. FIG. 31 is a sectional view of components 354 coupled together using fastener assembly 300 with second lock member 304 of fastener assembly 300 in a lock position. In the lock position, free ends 322 of tabs 318 are spaced axially from inner portion 308 and radially-extending teeth 324 are configured to engage ratchet teeth 344 of first lock member 302. Accordingly, first lock member 302 and threaded member 306 are prevented from rotating relative to second lock member 304. In addition, pins 316 engage components 354 to prevent rotation or loosening of fastener assembly 300 relative to components 354 when fastener assembly 300 is in the lock configuration.

Figure 32:
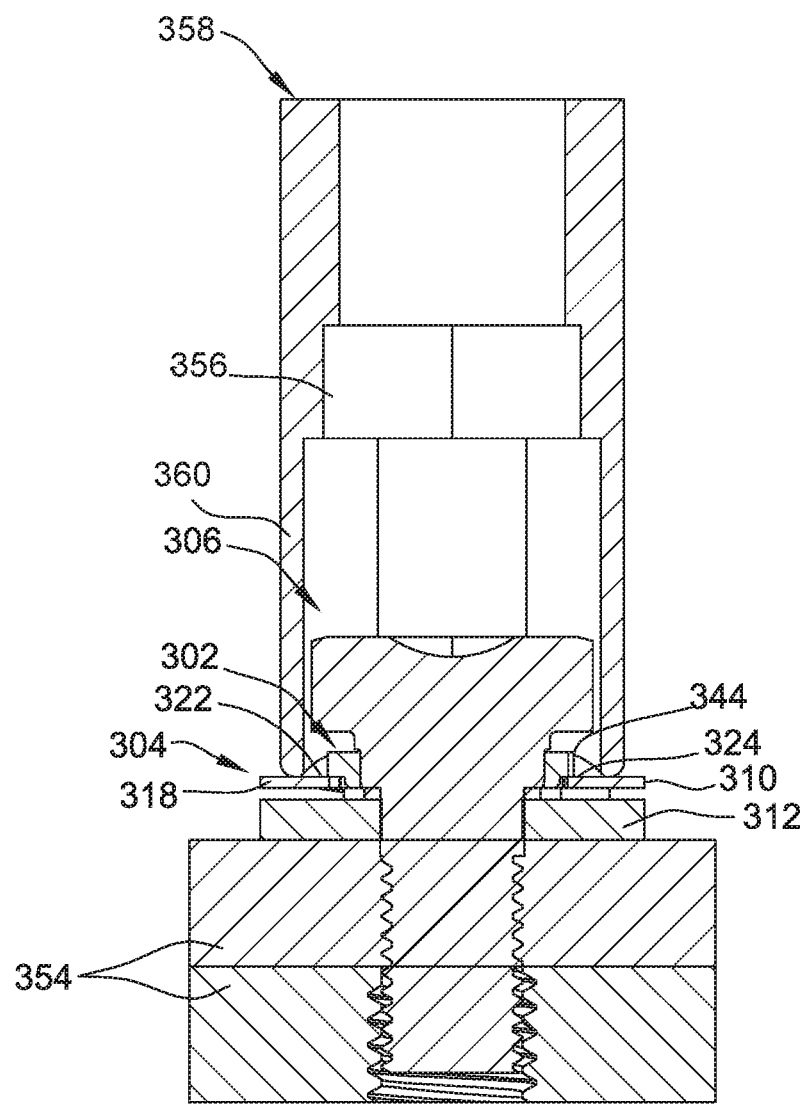
FIG. 32 is a sectional view of the components shown in FIG. 30 coupled together using the fastener assembly shown in FIGS. 22-24, the second lock member of the fastener assembly in an unlock position.

FIG. 32 is a sectional view of components 354 coupled together using fastener assembly 300 with second lock member 304 of fastener assembly 300 in an unlock position. In the exemplary embodiment, a stepped bore 356 of a tool 358 is sized to receive fastener assembly 300 such that a body 360 of tool 358 extends around and engages second lock member 304 coupled to threaded member 306. For example, tabs 318 of second lock member 204 extend beyond first lock member 302 because the maximum width of second lock member 304 is greater than a width of first lock member 302. Accordingly, tool 358 contacts tabs 318 and displaces tabs 318 axially when tool 358 is fitted over fastener assembly 300. Tool 358 contacts and displaces tabs 318 an axial distance such that teeth 324 disengage from teeth 344. Accordingly, tool 358 is configured to position second lock member 304 in the unlock position and allow rotation of first lock member 302 and threaded member 306 relative to second lock member 304 and components 354.

In some embodiments, the first and/or the second lock member are formed using an injection molding process from molded materials such as plastics. For example, in some embodiments, the moldable plastic materials are injecting into a mold during a multi-shot injection molding process and each component is formed as a single piece.

In some embodiments, the first or second lock member may be formed as two or more separate components. For example, in some embodiments, one or more of the lock members includes a base portion and an upper portion. The upper portion may be rigidly fixed to the base portion by a plurality of connection tabs or in any other suitable manner. The base portion and upper portion can be joined by clinching, welding and/or by rivets. At least one arm may extend from the upper portion and be configured to engage a lock nut and/or lock member. In addition, in some embodiments, at least one arm includes at least one vertical bend in the vertical or axial direction such that edge teeth are in a different plane than base portion and/or the upper portion. In further embodiments, the arms may include one or more 45° bends. As a result, the lock member provides a higher locking torque. In addition, the lock member may have areas of differing thickness to provide increased strength or sturdiness such as in the base. Also, the different components may have different dimensions. For example, the base member diameter can be larger without affecting the locking mechanism's diameter. In alternative embodiments, the lock members may include any number of pieces that enable the lock member to function as described herein, including, for example and without limitation, a single piece design.

In some embodiments, the fastener assemblies are assembled as a captive fastener assembly in which the threaded member, nut, and/or lock member(s) are coupled together and provided to a user as a single assembly. In such embodiments, the captive fastener assembly is ready for installation as a single unit without requiring additional components. Accordingly, the captive configuration simplifies installation and removal of the fastener assembly and reduces opportunities for damage by foreign objects.

The components as described herein provide locking and vibration resistant fastener assemblies. For example, as described in the embodiments herein, when the tool is removed from the associated fastener assembly, teeth on the first lock member again engage the locking apertures/teeth of the respective lock member. When the teeth are engaged, the lock member is positively locked in rotation due to the rotational locking relationship of the lock member to a component such as a panel. When the teeth are disengaged from the locking apertures/teeth, the lock member is a rotationally free relative to the engagement surface. In addition, the arrangements shown in the figures facilitate preventing over deflection of the lock members in response to the force "F" applied by tool.

Exemplary embodiments of systems and methods for rotationally locked fastener assemblies are described above. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The fastening device technology described herein has unlimited application in industry and other uses. Particularly advantageous applications will involve use near motors or moving equipment in which severe vibration may cause loosening of traditional fasteners such as in automotive applications, aerospace applications, military applications, road and construction applications, oil and gas, and manufacturing machinery. The present fastening device technology is also well suited for medical applications such as attaching pedicle screws to spinal rods, attaching spinal plates and fracture plates, fixing artificial joints, like hips and knees, orthopedic and maxillofacial external fixator systems, and the like. In particular, those skilled in the art will readily appreciate that embodiments of the fastening device technology described herein can withstand high temperature applications, for example, they can withstand temperatures as high as the material they are fabricated from can tolerate, and are easily applied, removed and reused. In addition, it is contemplated that the tightening of a nut number on a threaded member can be blind. For example, instead of the head portions, flats defined on the threaded member can be held or otherwise fixed during tightening.

In addition, some embodiments described herein provide adjustable diameter locking and vibration resistant fastener assemblies. For example, as described in the embodiments herein, when a tool is removed from the associated fastener assembly, teeth on the lock member engage the notches or ratchet teeth of the respective engagement surface. When the teeth are engaged, the lock member is rotationally locked due to the rotational locking relationship of the lock member to the lock member. When the tool is applied to the lock member, at least a portion of the lock member is displaced radially or axially to disengage the teeth from the ratchet teeth. When the teeth are disengaged from the ratchet teeth, the lock member is rotationally free relative to the engagement surface.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastener assembly comprising:
  a threaded member comprising a threaded body portion and a head portion;
  a first lock member including a plurality of axially-extending ratchet teeth and defining an aperture extending therethrough, the aperture sized to receive said threaded body portion; and a second lock member comprising:
  a base portion configured to couple to said threaded member for rotation therewith; and
  at least one spring finger extending axially from said base portion, said at least one spring finger having a proximal end joined to said base portion and a free end opposite said proximal end, wherein said second lock member has a lock position in which said free end of said at least one spring finger is configured to engage said plurality of axially-extending ratchet teeth and an unlock position in which said free end of said at least one spring finger is spaced from said plurality of axially-extending ratchet teeth.

2. The fastener assembly in accordance with claim 1, wherein said first lock member includes a body having an inner circumferential surface, an outer circumferential surface, and an annular surface extending between said inner circumferential surface and said outer circumferential surface, said axially-extending ratchet teeth extending upward from said annular surface.

3. The fastener assembly in accordance with claim 1, wherein said base portion of said second lock member comprises an annular ring, and wherein said at least one spring finger comprises a pair of spring fingers extending axially from said annular ring.

4. The fastener assembly in accordance with claim 3, wherein said pair of spring fingers and said annular ring are a single piece.

5. The fastener assembly in accordance with claim 1, wherein said head portion has a radially outer surface comprising an axially-extending slot defined therein, wherein said at least one spring finger at least partially engages said axially-extending slot when said base portion is coupled to said head portion.

6. The fastener assembly in accordance with claim 1, wherein said head portion is configured to receive said second lock member and includes a collar configured to engage said base portion.

7. The fastener assembly in accordance with claim 1, wherein said second lock member further comprises a plurality of axially-extending teeth on said free end of said at least one spring finger, and wherein said plurality of axially-extending teeth are configured to engage said axially-extending ratchet teeth in the lock position.

8. The fastener assembly in accordance with claim 1, wherein said first lock member includes at least one anti-rotation feature configured to restrict rotation of said first lock member when said fastener assembly is coupled to a panel.

9. The fastener assembly in accordance with claim 8, wherein said at least one anti-rotation feature comprises a plurality of surface structures that correspond to surface structures in the panel.

10. The fastener assembly in accordance with claim 1 further comprising a tool configured to switch said second lock member between the lock position and the unlock position, wherein said tool comprises a body defining a bore configured to receive at least a portion of said head portion and said second lock member therein such that said body engages said at least one spring finger.

11. A locking mechanism for a fastener assembly, said locking mechanism comprising
  a first lock member including a plurality of axially-extending ratchet teeth and a body defining an aperture extending therethrough, the aperture sized to receive a threaded member of said fastener assembly, said body having an inner circumferential surface, an outer circumferential surface, and an annular surface extending between said inner circumferential surface and said outer circumferential surface, said axially-extending ratchet teeth extending upward from said annular surface; and
  a second lock member comprising:
    an annular ring configured to couple to said threaded member for rotation therewith; and
    a pair of spring fingers extending axially from said annular ring, each spring finger of said pair of spring fingers having a proximal end joined to said annular ring and a free end opposite said proximal end, wherein said second lock member has a lock position in which each free end is configured to engage said plurality of axially-extending ratchet teeth and an unlock position in which each free end is spaced from said plurality of axially-extending ratchet teeth.

12. The locking mechanism in accordance with claim 11, wherein each spring finger of said pair of spring fingers extends radially outward from said annular ring such that said free ends define a maximum width of said second lock member.

13. The locking mechanism in accordance with claim 11, wherein said second lock member further comprises a plurality of axially-extending teeth on each free end.

14. The locking mechanism in accordance with claim 11, wherein said annular ring and said pair of spring fingers are a single piece.

15. A method of assembling a locking mechanism for a fastener including a threaded body portion, said method comprising:
  providing a first lock member including a plurality of axially-extending ratchet teeth, the first lock member defining a first aperture extending therethrough, the first aperture sized to receive the threaded body portion;
  forming a base portion of a second lock member, the base portion defining a second aperture extending therethrough, the second aperture sized to receive the threaded body portion;
  forming at least one spring finger of the second lock member, the at least one spring finger having a proximal end joined to the base portion and a free end opposite the proximal end; and
  bending the at least one spring finger at an angle relative to the base portion such that the at least one spring finger extends axially from the base portion, wherein the second lock member is positionable between a lock position in which the free end of the at least one spring finger is configured to engage the plurality of axially-extending ratchet teeth and an unlock position in which the free end of the at least one spring finger is spaced from the plurality of axially-extending ratchet teeth, wherein the base portion and the at least one spring finger are a single piece.

16. The method in accordance with claim 15 further comprising forming a plurality of teeth on the free end of the at least one spring finger, wherein the plurality of teeth extend axially from the free end and are configured to engage the axially-extending ratchet teeth when the at least one spring finger is bent at an angle relative to the base portion.

17. A fastener assembly comprising:
  a threaded member comprising a threaded body portion;
  a nut configured to threadably engage said threaded body portion;
  a first lock member including a plurality of axially-extending ratchet teeth and defining an aperture extending therethrough, the aperture sized to receive said threaded body portion, said first lock member comprising at least one anti-rotation structure configured to rotationally fix said first lock member with respect to said threaded member;
a second lock member comprising:
a base portion configured to couple to said nut for rotation therewith; and
at least one spring finger extending axially from said base portion, said at least one spring finger having a proximal end joined to said base portion and a free end opposite said proximal end, wherein said second lock member has a lock position in which said free end of said at least one spring finger is configured to engage said plurality of axially-extending ratchet teeth and an unlock position in which said free end of said at least one spring finger is spaced from said plurality of axially-extending ratchet teeth.

18. The fastener assembly in accordance with claim 17, wherein said first lock member includes a body having an inner circumferential surface, an outer circumferential surface, and an annular surface extending between said inner circumferential surface and said outer circumferential surface, said axially-extending ratchet teeth extending upward from said annular surface.

19. The fastener assembly in accordance with claim 17, wherein said base portion of said second lock member comprises an annular ring, and wherein said at least one spring finger comprises a pair of spring fingers extending axially from said annular ring.

20. The fastener assembly in accordance with claim 19, wherein said pair of spring fingers and said annular ring are a single piece.

21. The fastener assembly in accordance with claim 17, wherein said nut has a radially outer surface comprising an axially-extending slot defined therein, wherein said at least one spring finger at least partially engages said axially-extending slot when said base portion is coupled to said nut.

22. The fastener assembly in accordance with claim 17, wherein said nut is configured to receive said second lock member and includes a collar configured to retain said second lock member on said nut.

23. The fastener assembly in accordance with claim 17, wherein said second lock member further comprises a plurality of axially-extending teeth on said free end of said at least one spring finger, and wherein said plurality of axially-extending teeth are configured to engage said axially-extending ratchet teeth in the lock position.

24. The fastener assembly in accordance with claim 17 further comprising a tool configured to switch said second lock member between the lock position and the unlock position, wherein said tool comprises a body defining a bore configured to receive at least a portion of said nut and said second lock member therein such that said body engages said at least one spring finger.

25. A fastener assembly comprising:
a threaded member comprising a threaded body portion;
a first lock member including a plurality of radially-extending ratchet teeth and defining an aperture extending therethrough, the aperture sized to receive said threaded body portion, said first lock member comprising at least one anti-rotation structure configured to rotationally fix said first lock member with respect to said threaded member;
a second lock member comprising:
an inner portion defining an aperture extending therethrough, the aperture sized to receive said threaded body portion; and
an outer portion including at least one tab extending axially from said inner portion, said at least one tab having a proximal end joined to said inner portion and a free end opposite said proximal end, wherein said second lock member has a lock position in which said free end of said at least one tab is configured to engage said plurality of radially-extending ratchet teeth and an unlock position in which said free end of said at least one tab is spaced from said plurality of radially-extending ratchet teeth.

26. The fastener assembly in accordance with claim 25, wherein said first lock member includes a body having an inner circumferential surface, an outer circumferential surface, and an annular surface extending between said inner circumferential surface and said outer circumferential surface, said radially-extending ratchet teeth extending radially outward from said outer circumferential surface.

27. The fastener assembly in accordance with claim 25, wherein said at least one tab comprises a pair of diametrically opposite tabs extending from said inner portion.

28. The fastener assembly in accordance with claim 25, wherein said at least one tab has at least one bend such that said free end of said tab extends radially inward toward said radially-extending ratchet teeth.

29. The fastener assembly in accordance with claim 25, wherein said second lock member includes a plurality of radially-extending teeth on said free end of said at least one tab.

30. The fastener assembly in accordance with claim 25, wherein said second lock member further includes a base portion coupled to said inner portion and said outer portion, wherein said base portion comprises at least one first anti-rotation structure configured to restrict rotation of said outer portion and said inner portion relative to said base portion.

31. The fastener assembly in accordance with claim 30, wherein said base portion further comprises at least one second anti-rotation structure configured to restrict rotation of said base portion relative to at least one panel.

32. The fastener assembly in accordance with claim 25, wherein said second lock member is a single piece.

* * * * *